United States Patent
Radmilac et al.

(10) Patent No.: US 12,353,367 B2
(45) Date of Patent: Jul. 8, 2025

(54) DEPLOYMENT OF META-MODEL TOPOLOGIES AND MODERATING GRAPH GENERATION

(71) Applicant: MICROSOFT TECHNOLOGY LICENSING, LLC, Redmond, WA (US)

(72) Inventors: Marko Radmilac, Bellevue, WA (US); Andrew James Wald, Redmond, WA (US); Joshua Bryan Wyman Clemons, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/208,738

(22) Filed: Jun. 12, 2023

(65) Prior Publication Data

US 2024/0411733 A1   Dec. 12, 2024

(51) Int. Cl.
*G06F 16/21* (2019.01)
*G06F 40/40* (2020.01)

(52) U.S. Cl.
CPC ............ *G06F 16/212* (2019.01); *G06F 40/40* (2020.01)

(58) Field of Classification Search
CPC .............................. G06F 16/212; G06F 40/40
See application file for complete search history.

(56) References Cited

U.S. PATENT DOCUMENTS

| | | | |
|---|---|---|---|
| 11,875,250 B1* | 1/2024 | Xia | G06N 3/084 |
| 12,032,562 B1 | 7/2024 | Zuber | |
| 2004/0014826 A1 | 1/2004 | Wang | |
| 2013/0060807 A1* | 3/2013 | Rambhia | G06F 16/2455 707/769 |
| 2020/0356726 A1* | 11/2020 | Nelson | G06F 40/211 |
| 2023/0418665 A1 | 12/2023 | Chittibabu | |
| 2024/0273345 A1 | 8/2024 | Bharadwaj | |

OTHER PUBLICATIONS

Non-Final Office Action mailed on Aug. 22, 2024, in U.S. Appl. No. 18/208,743, 10 pages.
Cheng, et al., "Batch Prompting: Efficient Inference with Large Language Model APIs", arXiv:2301.08721v1, Jan. 19, 2023, 18 pages.

(Continued)

*Primary Examiner* — Charles Rones
*Assistant Examiner* — Xiaoqin Hu
(74) *Attorney, Agent, or Firm* — Workman Nydegger

(57) ABSTRACT

A meta-model topology comprises a plurality of functions and conforms to a global label schema. A new function not included in the plurality of functions is integrated into the meta-model topology. A particular label of interest that is associated with the new function is identified and the new function is configured such that an output from the new function conforms to an output form corresponding to the particular label of interest from the global label schema. The new function is then integrated into the meta-model topology and the meta-model topology that includes the new function is used to generate a model graph. The model graph is then deployed to a remote application that is configured to receive data prompts comprising input data processed by nodes of the model graph.

20 Claims, 24 Drawing Sheets

(56) References Cited

OTHER PUBLICATIONS

Dong, et al., "Efficiently Scale LLM Training Across a Large GPU Cluster with Alpa and Ray", NVIDIA Developer, May 15, 2023, 16 pages.
International Search Report and Written Opinion received for PCT Application No. PCT/US2024/033319, mailed on Oct. 4, 2024, 16 pages.
International Search Report and Written Opinion received for PCT Application No. PCT/US2024/033320, mailed on Oct. 4, 2024, 15 pages.
U.S. Appl. No. 18/208,741, filed Jun. 12, 2023.
U.S. Appl. No. 18/208,743, filed Jun. 12, 2023.
International Search Report and Written Opinion received for PCT Application No. PCT/US2024/033318, Sep. 10, 2024, 14 pages.
Li, et al., ""HOT" ChatGPT: The promise of ChatGPT in detecting and discriminating hateful, offensive, and toxic comments on social media", In Repository of arXiv:2304.10619v1, Apr. 20, 2023, 42 Pages.
Corrected Notice of Allowability mailed on Apr. 24, 2025, in U.S. Appl. No. 18/208,743, 12 pages.

* cited by examiner

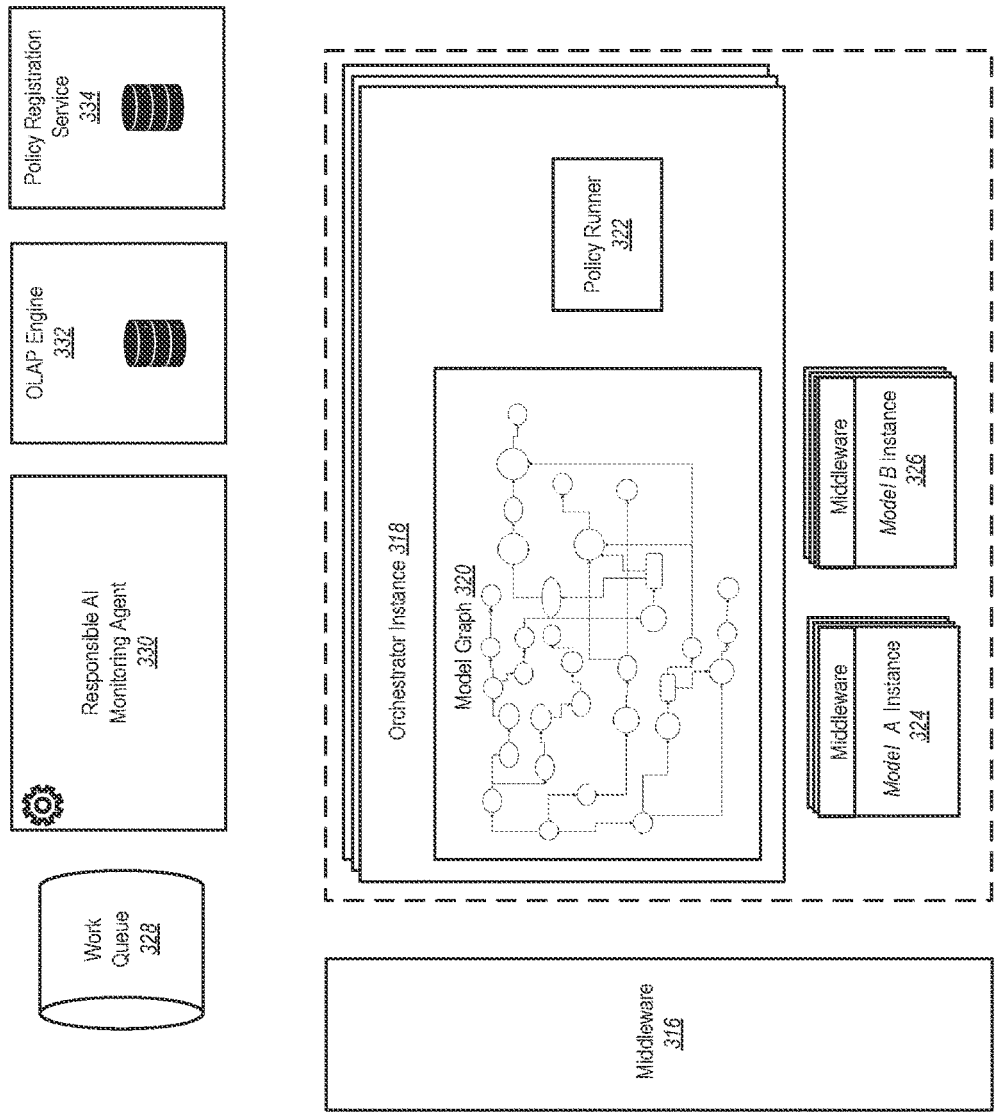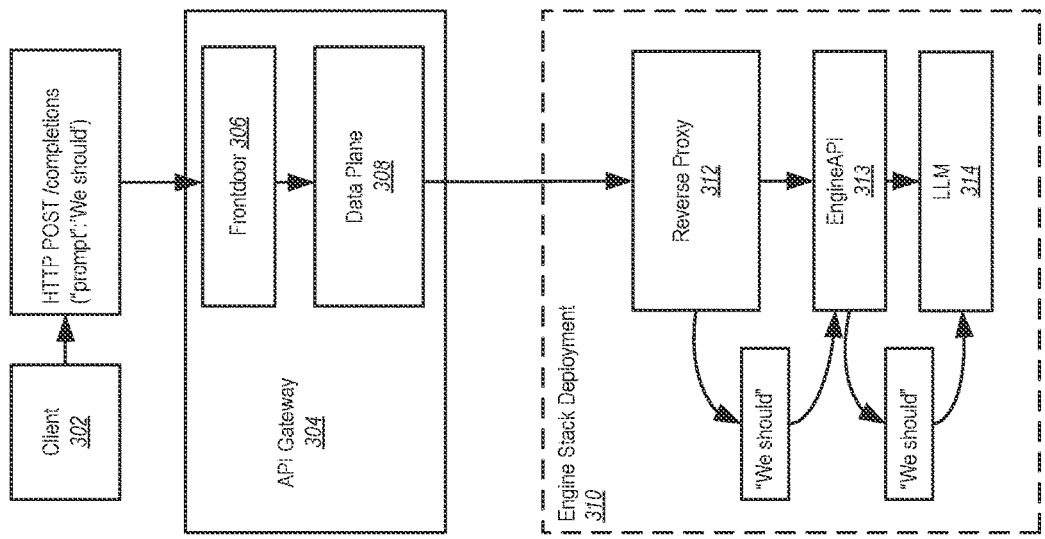
FIG. 4

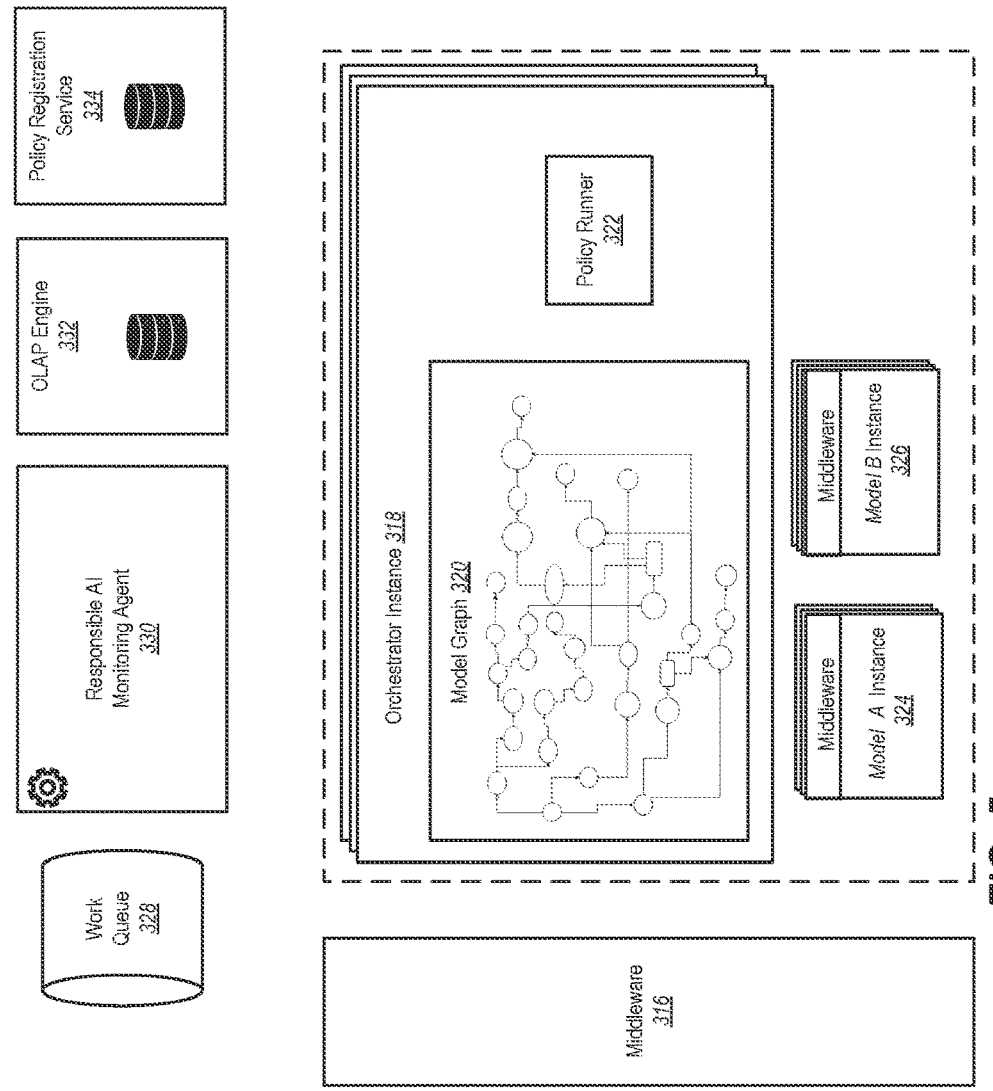
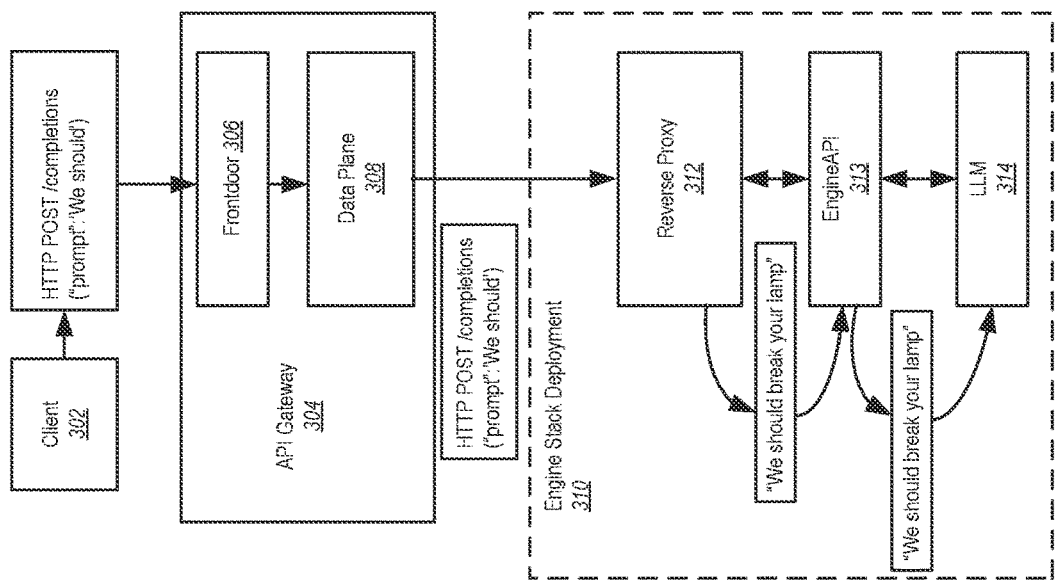
FIG. 5

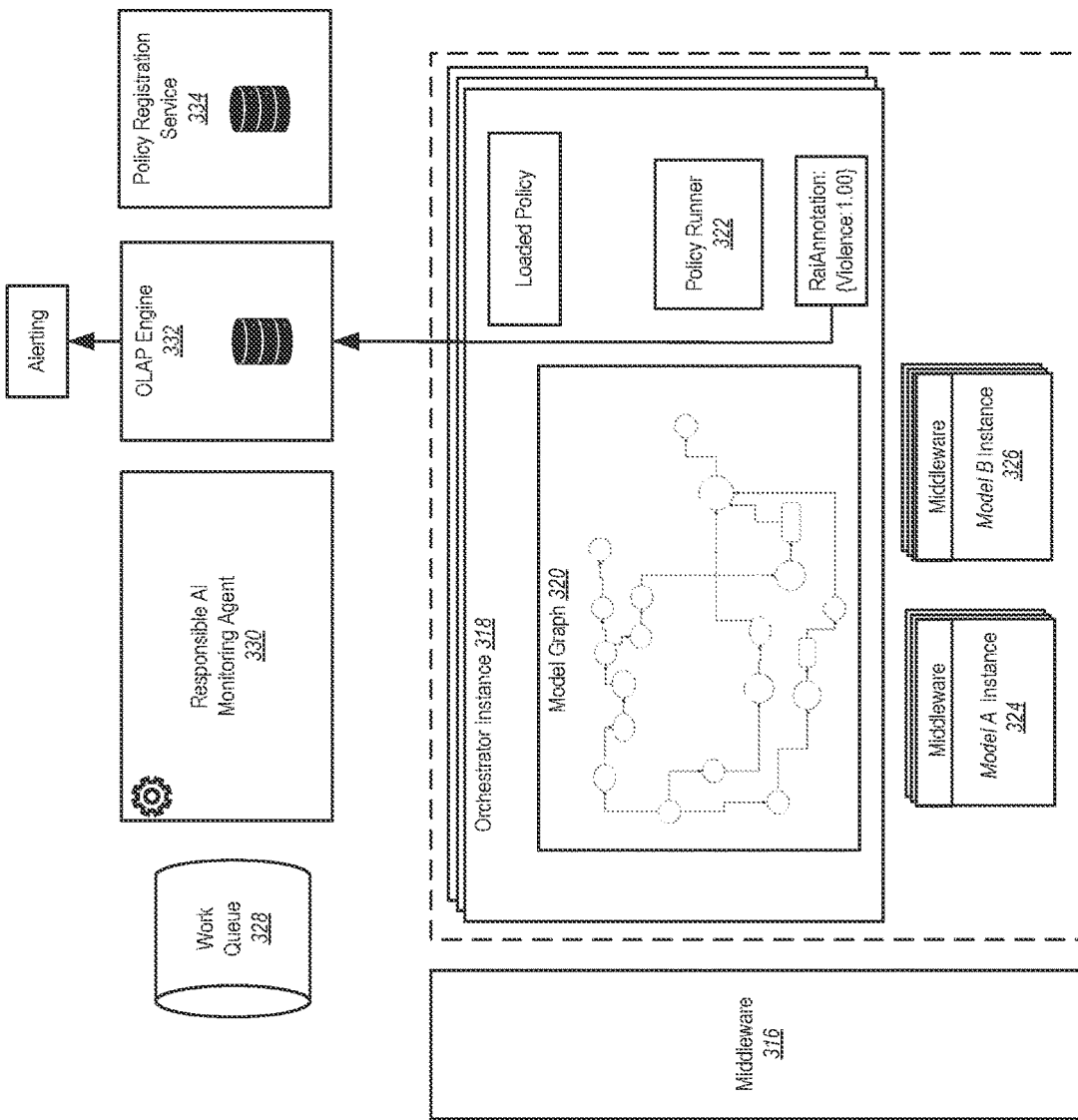
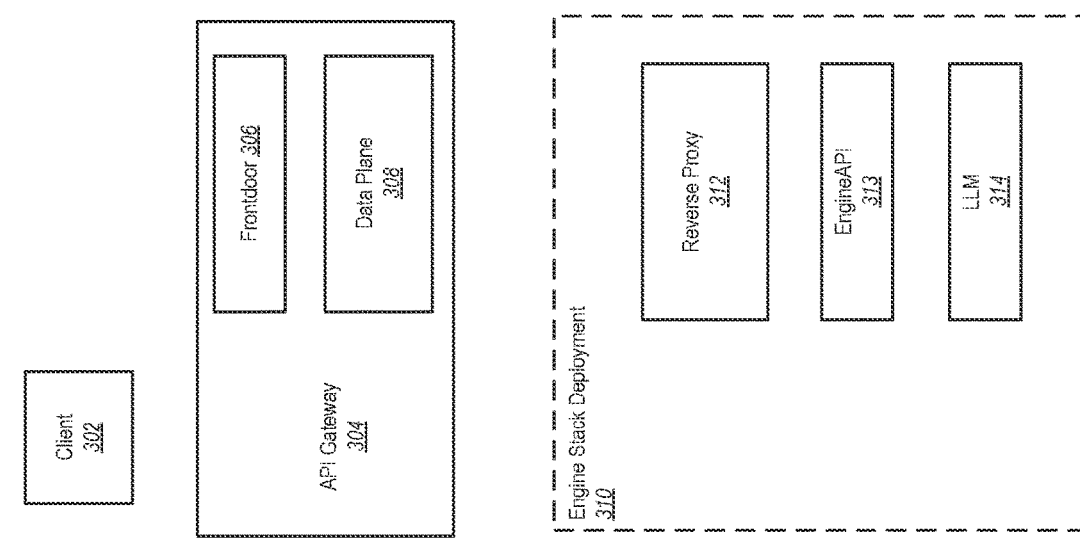
FIG. 13

DEPLOYMENT OF META-MODEL TOPOLOGIES AND MODERATING GRAPH GENERATION

BACKGROUND OF THE INVENTION

Conventional machine learning models are configured to receive an input prompt and to generate outputs that are based on the input prompts. The outputs generated by the machine learning models are produced after applying various layers of the machine learning models to the input prompts.

In some instances, large language models (LLMs), like ChatGPT are also configured to generate outputs based on an initial seed prompt, as well as intermediary prompts derived from outputs related to the initial prompts and which may be part of an interactive conversation between a user and the LLM interfaces. For example, conventional systems can apply the LLMs to the initial input prompts and generate preliminary outputs that are further used to formulate derived intermediary prompts. Then, new intermediary outputs can be generated by applying the LLMs to the newly derived intermediary prompts. This cycle can continue as part of an interactive conversation until a desired final output is generated, which is based on the full set of initial and intermediary prompts processed by the LLMs.

In some instances, the LLMs will include, or at least enable a user to interact with, a plurality of discrete and interconnected machine-learning models that are applied to the different prompts that are being processed. However, as the number and complexity of machine learning models used in processing the input prompts increases, the user experience, including the authoring and linking of the different prompts together, becomes more complicated and cumbersome as a user must navigate through the different models and model interfaces being used to process the various input prompts.

Conventional LLMs, as well as model networks that further process and analyze outputs from LLMs including interconnected sets of machine learning models, often serve a large and diverse group of users across different enterprises. Because of this, the computer hardware such as the central processing units (CPUs), graphics processing units (GPUs) and neural processing units (NPUs) that process the workloads of the different models can easily become overtaxed as they process multiple input prompts for the different users.

It is also noted that the existing models continue to evolve. As new models are being developed and interlinked with existing models, it becomes quite difficult for conventional systems to coordinate and integrate the functionality of the different models within the conventional model frameworks.

In some instances, machine learning models may also produce outputs that contain undesired content, such as hate speech, content that may be offensive to some users, or other types of undesired content which may violate specific enterprise policies, for example. This is particularly true for systems that utilize frameworks that interlink multiple machine learning models that consider disparate sets of parameters and that chain together the intermediate outputs and prompts from the different models.

In view of the foregoing, there is an ongoing need for improved systems and methods for generating, deploying, and moderating artificial intelligence frameworks comprising large language models and/or other types of multiple machine learning models used for generative tasks, and particularly for improved systems and methods for facilitating moderation of content that is processed and generated by the multiple machine learning model frameworks.

The subject matter claimed herein is not limited to embodiments that solve any disadvantages or that operate only in environments such as those described above. Rather, this background is only provided to illustrate one example technology area where some embodiments described herein may be practiced.

SUMMARY OF THE INVENTION

Disclosed embodiments include or may be used for deploying and modifying meta-model topologies and for planning the generation of model graphs based on the meta-model topologies. Disclosed embodiments also include methods and systems for utilizing the model graphs converted from meta-model topologies to process prompts and to generate corresponding outputs.

The disclosed meta-model topologies comprise a plurality of different functions. In some instances, the different functions are incorporated into a model graph as graph nodes (i.e., each function of the plurality of different functions is represented by a particular node in the model graph). Each function in an instantiated meta-model topology is configured to perform an operation on input data received by the function in order to generate a label value corresponding to a label of interest included in a global label schema.

In some instances, after accessing an existing meta-model topology, the disclosed systems are used to modify the meta-model topology by removing existing functions and/or by adding new functions to the meta-model topology. In order to integrate a new function into the meta-model topology, the systems identify which label of interest from the global label schema is associated with the new function and configure the new function such that its output conforms to an output form corresponding to the particular label of interest. Subsequent to configuring the new function, the system integrates the new function into the meta-model topology.

Once the new function is integrated into the meta-model topology, the systems convert the meta-model topology into a model graph comprising different nodes and edges. Each function of the meta-model topology is represented by a different node in the model graph. Data dependencies between the functions are represented by edges between two or more nodes. After the model graph is generated from the meta-model topology, systems then deploy the model graph to a remote application that is configured to receive data prompts and process the data prompts using the model graph.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the advantages and features of the systems and methods described herein can be obtained, a more particular description of the embodiments briefly described above will be rendered by reference to specific embodiments thereof which are illustrated in the appended drawings. Understanding that these drawings depict only typical embodiments of the systems and methods described herein, and are not, therefore, to be considered to be limiting in their scope, certain systems and methods will be described and explained with additional specificity and detail through the use of the accompanying drawings in which:

FIGS. 3-13 illustrate an example data flow between components of an example computer architecture for facilitating the use of a meta-model topology with a client-facing system.

DETAILED DESCRIPTION OF THE INVENTION

Figure 1:
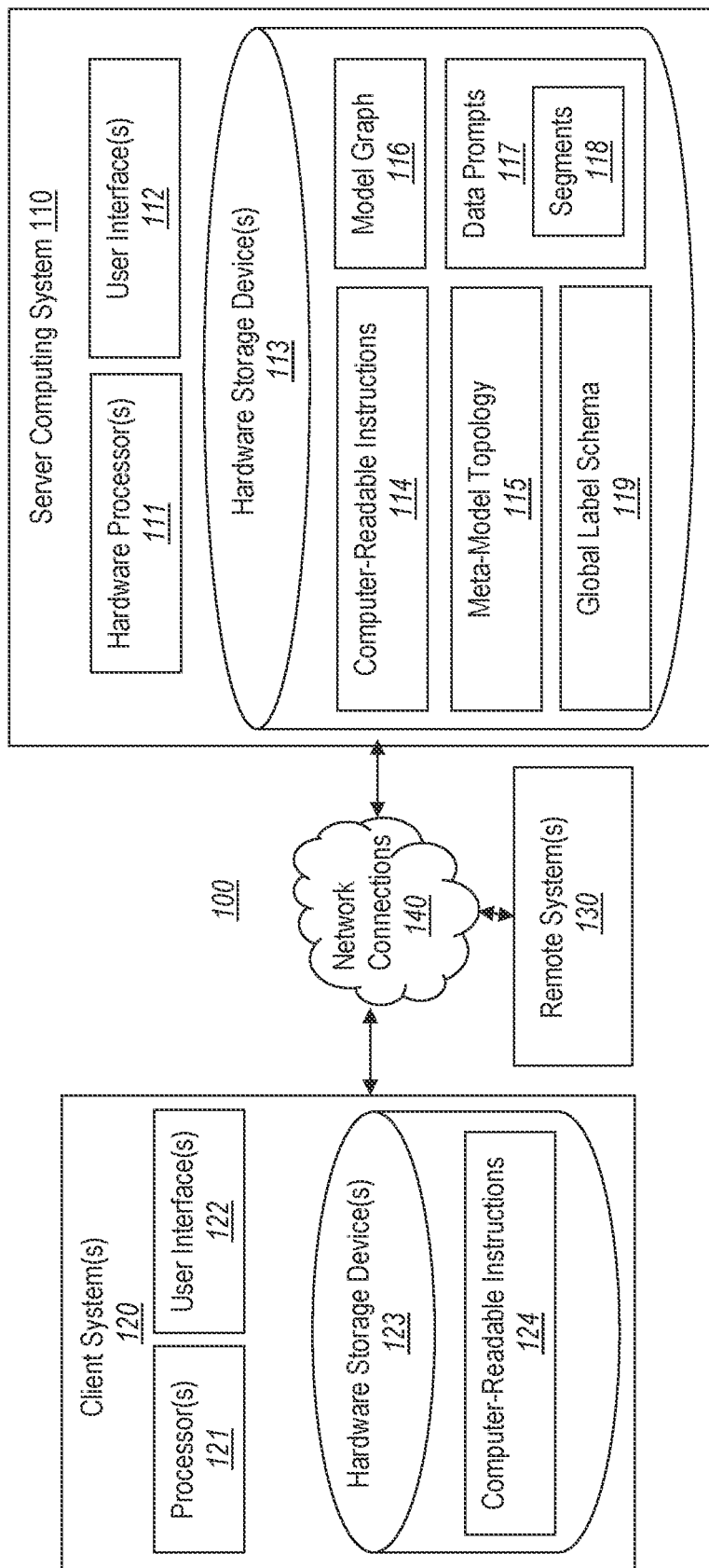
FIG. 1 illustrates an example computer environment in which a computing system incorporates and/or is utilized to perform one or more aspects of the disclosed embodiments.

Disclosed embodiments include systems methods for generating and utilizing meta-model topologies. A meta-model topology refers to a plurality of interdependent models or functions which have been abstracted into a multi-layered or multi-leveled network, in which only some inputs and outputs of the meta-model topology are visible through a user-facing system. The different models or functions are configured to perform different discrete tasks for facilitating the processing of different input data. For example, some models or functions are configured to facilitate content moderation, annotation or label generation, content modification, content generation, etc. As described in more detail below, the different models and functions are configured as neural networks, pattern-matching algorithms, or for performing other data operations. The framework of the meta-model topology also allows for streamlined integration of new models into the meta-model topology such that the inputs and outputs of the models included in the meta-model topology are compatible with each other.

In some instances, a meta-model topology is configured to perform content moderation for data prompts generated by large language models or networks of many different models. Some embodiments include processing segments of data prompts with multiple instances of a model graph, wherein each instance of the model graph is tuned to a particular segment of the data prompt. Some embodiments include autoscaling of the model graph instances. Some disclosed embodiments also include dynamic batching of prompt queries. Dynamic batching also applies to any data processing requests, including user-generated prompts and model-generated completions of prompts.

The disclosed embodiments provide many technical benefits over conventional systems. For example, the disclosed embodiments facilitate the distribution of service components and enforce a common schematic for orchestrating and coordinating the application of dynamic model frameworks that may be scaled to accommodate ever-growing numbers and varieties of models. By implementing systems in this manner, the disclosed embodiments achieve significant improvements in computing efficiency for processing requests received across multiple enterprises and users. There are also improvements in computing efficiency across different tasks and applications for which the meta-model topologies are trained and configured. Such frameworks also create definitions of the interfaces, contracts, and libraries to enable cross-organization teams to be able to contribute their models into production using a programmatic and uniform specification.

Disclosed embodiments also improve the user experience by abstracting away the multitude of models, labels, and taxonomies created for different modalities, such as speech, text, and image. Such embodiments allow for easy, "no code" composition of these models into a coherent set of content moderation configuration objects and policies. Thus, when making any change in the models, the underlying network is abstracted away from the user, wherein the user is presented with a streamlined user interface for a singular, monolithic meta-model capable of enforcing content moderation according to different policies associated with different prompts processed by the meta-model. With such embodiments, users can gain access to higher-quality systems without needing to understand the details behind each model included in the system.

In some embodiments, the system comprises a single model, such as a large language model or generative pre-trained (GPT) model. Alternatively, the system comprises a plurality of smaller models linked together. In either case, the model(s) included in the system are conformed to a global label schema that comprises a set of pre-defined labels and taxonomies. Beneficially, any backend changes to the model(s) of the system will not affect the streamlined nature in which a user interacts with the front-end interface.

Disclosed techniques for batching processing requests for the different nodes can also beneficially improve the efficiency of the processing being performed at the different nodes, and while also beneficially enabling the meta-model to service a plurality of different prompts from different users in parallel.

Overall, the disclosed embodiments facilitate close collaborations between many different model owners and provide standardization across models for labels and taxonomy. The disclosed embodiments also facilitate the scalability of the meta-model frameworks and provide flexibility in the composition of models that can be linked together, while providing techniques for reducing the latency of the model execution.

Computing System Implementation

Attention will be first directed to FIG. 1, which illustrates a computing system 110 that is integrated within a computing environment 100 that also includes client system(s) 120 and remote system(s) 130 in communication (via a network 140) with the computing system 110. These systems incorporate and/or may be used to implement the disclosed embodiments.

By way of example, the computing system 110 includes one or more processor(s) (such as one or more hardware processor(s) 111), storage (i.e., hardware storage device(s) 113) storing computer-readable instructions 114 which are executable by the processor(s) 111, to cause the computing system 110 to implement one or more aspects of the disclosed embodiments. The computing system 110 also includes a user interface(s) 112 for receiving user input such as prompts that are processed by computing system 110, as well as for rendering output based on the processed prompts, for example. The computing system 110 may also include corresponding input/output (I/O) hardware devices for receiving the user input and for rendering the corresponding output.

As shown, the client system(s) 120 also includes one or more processor(s) 121, user interface(s) 122, one or more (I/O) devices, and one or more hardware storage device(s) 123 storing computer-readable instructions 124 that are executable by the processor(s) 121 to implement the functionality described herein.

Although not shown, the remote system(s) 130 may also include processors, user interfaces, (I/O) devices, and storage that stores computer-readable instructions that are executable by the processors to implement the functionality described herein.

As shown in FIG. 1, hardware storage device(s) 113 and hardware storage device(s) 123 are shown as discrete local storage units. It will be appreciated, however, that these storage devices may each be configured as distributed storage devices contained locally and/or distributed remotely. Additionally, in this regard, the computing system 110 and/or the client system(s) 120 can each be considered a distributed system with any combination of their components being maintained and/or executed locally and/or remotely. In some instances, a plurality of distributed systems performs similar and/or shared tasks for implementing the disclosed functionality, such as in a distributed cloud environment.

In some instances, the computing system 110, the client system(s) 120, and/or remote system(s) 130 are configured to generate, train, and/or use various machine learning models during the generation and deployment of a meta-model topology 115 and corresponding model graphs (e.g., model graph 116).

The meta-model topology 115 comprises a plurality of models, or more broadly, a plurality of functions that are used to process input data during inference. The meta-model topology also has a global label schema 119 comprising a plurality of labels of interest which can be used to annotate various portions of the input data. In some instances, every model or function included in the meta-model topology 115 is conformed to generate a label value corresponding to at least one label of interest selected from the global label schema. The models or functions that relate to similar labels of interest are also grouped or linked together within the meta-model topology.

The models referenced herein are sometimes configured as machine-learning models or machine-learned models, such as deep learning models and/or algorithms and/or neural networks. Such models may include LLMs. Some LLMs are a particular kind of Large Generative Model (LGM) which can receive multi-modal inputs and generate multi-modal outputs, including processing real-time streaming content. In some instances, the models may also be configured as engines or processing systems (e.g., computing systems integrated within computing system 110), wherein each engine comprises one or more processors (e.g., hardware processor(s) 111) and computer-readable instructions 114 corresponding to the computing system 110.

The term model also refers, in some instances, to the abstraction representing the process by which inputs are used to classify or regress on one or more labels of the global label schema 119.

Some models are programmatically defined as different subtypes of models that are pluggable into the framework and invoked by a service. Models can also invoke other models in a composite fashion and can define functions on inputs and inner model outputs to serve as both outputs and inner model inputs (see FIG. 14). In some instances, the models or functions simply marshal work to and from remote endpoints where the actual models are hosted, or they may directly apply logic.

In some configurations, a model is a set of numerical weights embedded in a data structure, and an engine is a separate piece of code that, when executed, is configured to load the model and compute the output of the model in the context of the input.

The functions included in the meta-model topology are configured to perform various operations on input data to generate a function output comprising a label value corresponding to a label of interest from the global label schema. For example, the functions are configured to execute logic or apply an operation to the input data. Examples of logic that may be executed include pattern matching, such as n-gram matching, block lists, or regular expressions. Some pattern matching is also executed with a Trie data structure, where each TrieNode is a group of similar patterns, for example, a bigram, regex, or wildcard. Some functions are local neural networks or lightweight alternative classifiers such as random forest and decision trees, Bayes nets, or regressions. Such models are configured for tasks such as deciding whether a portion of the data stream is an obvious positive case so that downstream models that provide additional analysis or increased accuracy in predicting the positive case are not invoked.

In some instances, each function generates a label of interest for a particular portion of input data or generates an intermediary output that is used as input to a downstream function or is used in combination with other intermediary outputs to generate the final label of interest. In some instances, models only output labels from the global label schema 119. This is a predetermined constraint of the framework that is introduced to enforce simplification and maintainability of the registered model subtypes. In particular, this constraint facilitates future refactoring of how models are ensembled.

In some instances, any model in the system can potentially output a value for any label registered in the global label schema 119. However, each model specification states which outputs it has enabled out of the candidate set from the global label schema 119.

Additionally, or alternatively, the meta-model topology 115 comprises a plurality of models which are configured to take in an initial seed prompt or intermediary prompt and generate new outputs based on the initial seed prompt or intermediary prompt and a plurality of models which are configured to process the new outputs. For example, the meta-model topology is configured, in some instances, to include models which call to one or more different nodes or layers of a large language model, such as a GPT model.

By implementing systems in this manner (essentially where the orchestrator 318 comprises a model graph 320 integrated with LLM 314), the system can both generate new output and process the new output in an alternating series. In some instances, for example, a first model/node of the integrated model graph may receive a first new initial seed prompt and generate a new output based on the new initial seed prompt. A second model then analyzes the new output for any unwanted content and generates a value for a particular label in the global label schema 119.

In some instances, if the value exceeds a predetermined threshold value for the particular label, the system modifies the initial seed prompt and applies the modified initial seed prompt to the first model to generate a second new output. The second new output is then analyzed/processed by the second model and a new value is generated for the particular label in the global label schema. The initial seed prompt is modified to help guide the first model to generate a second new output that has a lower value for the particular label in the global label schema.

The model graph 116 comprises a plurality of nodes representing unique functions configured to perform operations on input data and configured to generate label values corresponding to one or more labels of interest included in a global label schema 119 associated with the model graph.

In some instances, the global label schema 119 is configured as a taxonomy by which to structure and wrap the different models included in the meta-model topology 115. Some global label schemas are configured as content moderation schemas, responsible artificial intelligence (AI) schemas, or "safe AI" schemas, which comprise labels of interest that facilitate the monitoring and flagging of undesired model-generated output. The global label schema can be updated and modified as new models and new labels of interest are developed and defined.

By providing a meta-model topology defined by a global label schema in this manner, model frameworks are improved over conventional systems which do not have access to a large dataset of multi-label examples or a universal schema that provides a superset of attributes for internal dataset and model output curation. Additionally, the framework provides a way for independently created and trained models to be easily integrated into a meta-model topology without having to undergo further training or fine-tuning. Instead, the models/functions and their outputs are conformed to the global label schema. This results in improved computing efficiency because it saves the system from having to further train any model prior to or during integration into the meta-model topology. Further computing efficiencies are achieved in that the meta-model topology also does not have to undergo additional training when a new model is integrated into its framework.

This allows for distributed service components to be integrated across arbitrary cross-company model contributions such as neural models, n-gram guard lists, embedding clustering, composite models, and policies into the meta-model topology. The disclosed system can host all models within the entire meta-model framework. Alternatively, the system can use the framework to interface with and manage the offloading of work to one or more remote model processing systems.

The hardware storage device(s) 113, in addition to housing the computer-readable instructions 114, meta-model topology 115, global label schema 119, and model graph 116, also houses various electronic data including data prompts 117. These data prompts 117 can be generated by a human or artificial user. There are many different types of data prompts, including initial input prompts which are used as input for a generative pre-trained model to output a completed prompt (e.g., the output of a processed input prompt).

The meta-model topology 115 and corresponding model graph (e.g., model graph 116) can also be used to process completed prompts generated by the generative pre-trained models, or other types of models. In some instances, these completed prompts or completions of the initial input prompts are generated as streaming content. Additionally, any of the data prompts comprises either unimodal (e.g., text-only) or multi-modal data content (e.g., text and image content). In some instances, the generative pre-trained models generate the completed prompts one token at a time, very rapidly. These tokens can then be buffered and/or segmented before being run through the model graph. Thus, streaming content or streams can refer to either the user-generated prompts or the model-completed prompts, or a combination of both.

In some instances, the data prompts 117 comprise electronic content retrieved from one or more external sources, such as emails, text messages, research articles, websites, news articles, papers, movies and television shows, audio files such as music or podcasts, or other media content. Accordingly, the data prompts 117 can also comprise various modalities of electronic content, including text, audio, images, and/or videos. Thus, it should be noted that, in some instances, the different models and functions that process similar modalities of data are also grouped or linked together within the meta-model topology 115.

Additionally, in some instances, the data prompts 117 are segmented into a plurality of data prompt segments (e.g., segments 118). The data prompts 117 can be segmented in many different ways. For example, the data prompts 117 can be segmented by sentence, by paragraph, or by another predetermined length of the text segment (e.g., word count. In some instances, the data prompts 117 are segmented based on topic or theme.

In some instances, the data prompts 117 (which comprise an initial seed prompt) are segmented prior to being routed to a large language model for processing to generate output that is then processed by the meta-model topology. Alternatively, the data prompt comprises output from the LLM, which is then segmented prior to being routed to the meta-model topology for policy compliance and content moderation processing.

These segments can each be processed separately (e.g., in parallel) by multiple instances of the model graph 116. Each instance of the model graph 116 can be pruned according to metadata or policy information associated with each segment of the data prompt. In some instances, the data processing request (e.g., data prompt) includes a header or other specification as to what policy to use. For example, the entire policy is given inline, and an identification code is included with the data processing request such that the system can use the identification code to retrieve a remotely stored policy, or the policy can be built into the binary source code that is executed during deployment. The policy contains information for (i) what segmenter components are selected to be used and/or (ii) which labels in the global label schema are of interest. It should be appreciated that a system may select from a plurality of segmenters which are each configured to perform different segmentations strategies for different labels included in the global label schema. Each segmenter produces segments and each segment produced is processed through the entirety of a model graph that has been instantiated for that segment.

Figure 2:
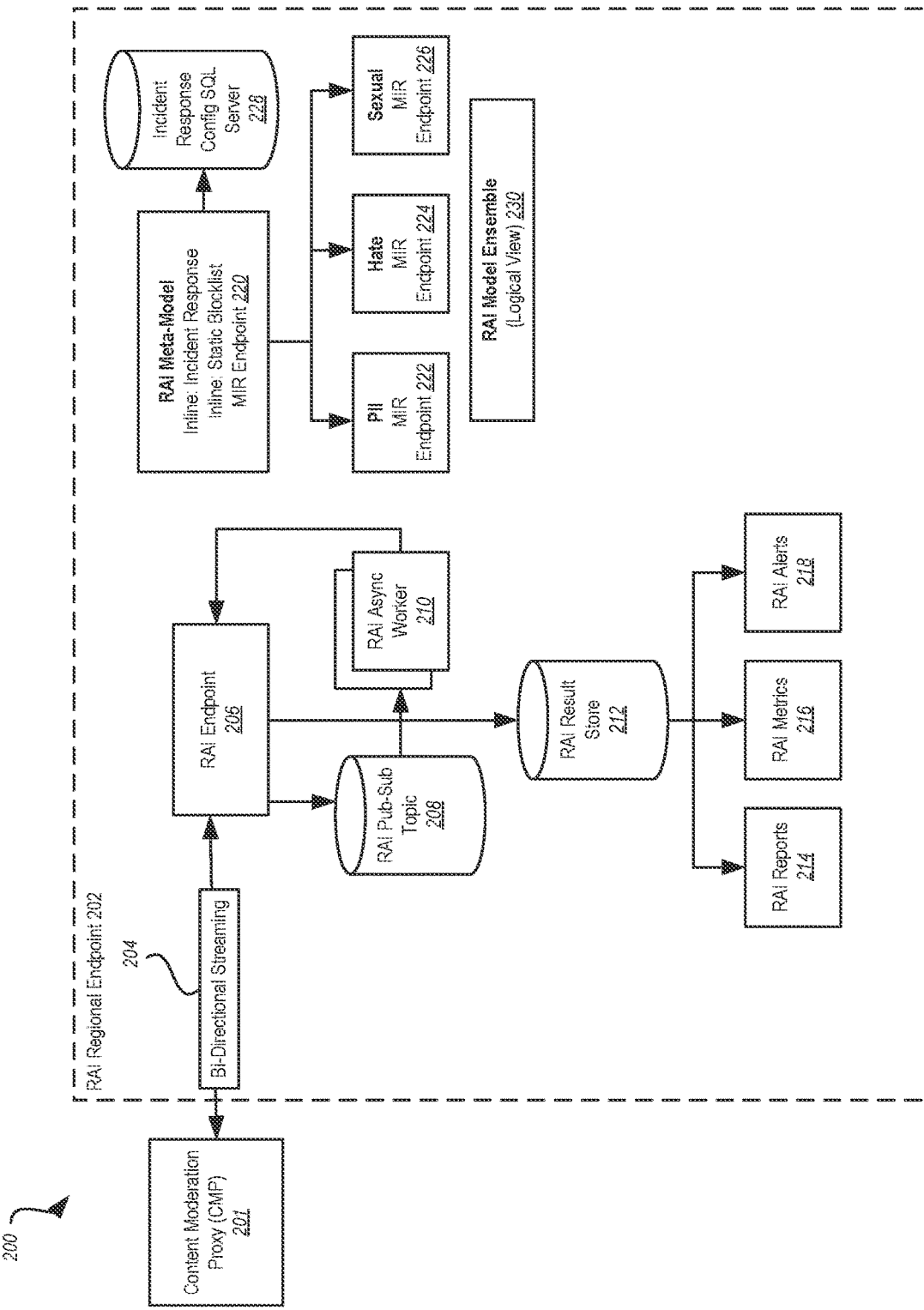
FIG. 2 illustrates an example computer architecture for configuring a meta-model topology as a content moderation system.

Attention will now be directed to FIG. 2, which illustrates an example computer architecture for configuring a meta-model topology as a content moderation system. The meta-model topology 115 and corresponding model graph (e.g., model graph 116) are configured to perform content moderation as part of a responsible artificial intelligence (RAI) system. In particular, the RAI system monitors output generated by one or more different models (e.g., large language models and generative pre-trained models like ChatGPT.

FIG. 2 illustrates an RAI regional endpoint 202 which is in communication with a content moderation proxy 201 or reverse proxy. The RAI regional endpoint 202 facilitates the connection between the different components of the RAI framework and third-party systems. The reverse proxy receives data processing requests, including initial prompts that are provided to a remote generative model. The output from the remote generative model is then routed to the RAI Endpoint 206 from the reverse proxy. In some instances, the communication between the reverse proxy and the RAI regional endpoint is a bidirectional remote procedure call (BIDI-GRPC) to allow for the transmission of inputs and outputs for electronic content in streaming applications where initial input prompts are streaming in and moderated/annotated completed prompts are streaming out.

In one embodiment, in streaming applications where data is segmented, as the system receives a stream of data (e.g., text and/or images), the policy-dependent segmenters perform segmentation on the stream and execute a graph instance for each segment. As the system receives results from each graph run, the system streams back the results to one or more systems which facilitates the response streaming side of the RPC request. In some instances, the results are streamed back to a user-facing system. The application stream start/end position is indicated in each result message. The result message is configured like a summary report for its corresponding segments and refers to the position via text offset. Images are assumed to be zero-length text sitting at character positions of the data stream.

The RAI regional endpoint 202 is shown having an RAI Endpoint 206 which is in communication with an RAI Pub-Sub Topic 208, an RAI Result Store 212, and an RAI Async Worker 210. The RAI Pub-Sub Topic 208 coordinates and routes processing requests between the RAI Endpoint 206 and the RAI Async Worker 210.

The RAI Result Store 212 stores the following: RAI Reports 214, RAI Metrics 216, and RAI Alerts 218. The RAI Reports 214 comprise performance reports, details on various tasks, and updates to the RAI system. The RAI Metrics 216 include metrics such as processing efficiency, the current number of model graph instances running, and pruning times. RAI Alerts 218 include alerts such as system failure alerts, system completion alerts, as well as label alerts for when content is identified and/or flagged as violating a particular moderation or compliance policy.

The RAI Async Worker 210 coordinates between the RAI Endpoint 206 and the RAI Pub-Sub Topic 208 to orchestrate the different processing requests and model instantiations on the asynchronous processing path of the disclosed framework.

The RAI regional endpoint 202 also comprises the RAI meta-model 220 (e.g., meta-model topology 115 of FIG. 1). The RAI meta-model 220 is in communication with an incident response server 228 and various RAI endpoints. These RAI endpoints are focused on different labels of interest, which a user may want to monitor or use as a basis for flagging and filtering inappropriate content. Examples of RAI endpoints include personal identifying information (e.g., endpoint 222), a hate speech endpoint (e.g., endpoint 224), and a sexual content endpoint (e.g., endpoint 226). Each of these endpoints corresponds to a particular label of interest (e.g., PPI, hate speech, or sexual content) which can be used to flag, annotate, and/or modify input data.

The different labels of interest corresponding to the different RAI endpoints are stored within a global label schema, like global label schema 119 of FIG. 1. The RAI meta-model 220 comprises one or more RAI model ensemble(s), (e.g., RAI model ensemble 230) comprising a plurality of models and functions which perform various operations on the input data at different times during inference of processing the input data.

Overall, systems such as RAI system 200 beneficially provide a framework to monitor content generated by and/or processed by different machine learning models, in order to prevent harmful or potentially harmful content from reaching a client-facing system and/or to otherwise enforce policy compliance. This improves the user experience by protecting them from receiving undesired generated content. Additionally, such frameworks also allow model administrators to monitor the parameters of the different machine learning models. The model administrators can be alerted in real-time if a model is generating content irresponsibly and either halt content generation or reconfigure/retrain the model to avoid generating harmful content.

Meta-Model Topology and Deployment

Attention will now be directed to FIGS. 3-13, which illustrate an example data flow between components of an example computer architecture for facilitating the use of a meta-model with a client-facing system. It should be appreciated that while in some applications, the meta-model topology is configured for an RAI system, the disclosed embodiments apply to many different applications. The system 300 beneficially supports a flexible ensemble of any number of models, which are subject to change at any time.

System 300 also supports the evolving data schema of labels, which can be added or replaced over time. Labels comprise categorical binary classification, categorical regressions, or other combinations. The disclosed framework is also configured to support different principals (e.g., users, tenants, resource object associations), such that their contributions are subject to standards of acceptability for each label.

The system 300 supports synchronous request/response filtering and asynchronous monitoring. For example, a contributor can deploy a compute-intensive model to only the asynchronous path because the risk of incurred latency on the synchronous path may not offer worthwhile value. In another example, a contributor can deploy an undertrained model to only the asynchronous path so that there is an opportunity for human labeling of low-confidence prediction samples and follow-up training of those models. Similarly, some models are only useful for monitoring, not for delivering client-facing output.

Additionally, the same model can be deployed with two different operating points on the filtering and monitoring paths. The filtering path conservatively prefers low rates of false positives, trading off recall for better precisions, while the monitoring path may be tuned toward higher tolerance of low probability predictions, instead optimizing for higher recall capabilities. In summary, a primary goal of the synchronous or filtering path is to block content or annotate with warnings, while a primary goal of the asynchronous or monitoring path is to flag models, functions, and content for follow-up.

Figure 3:
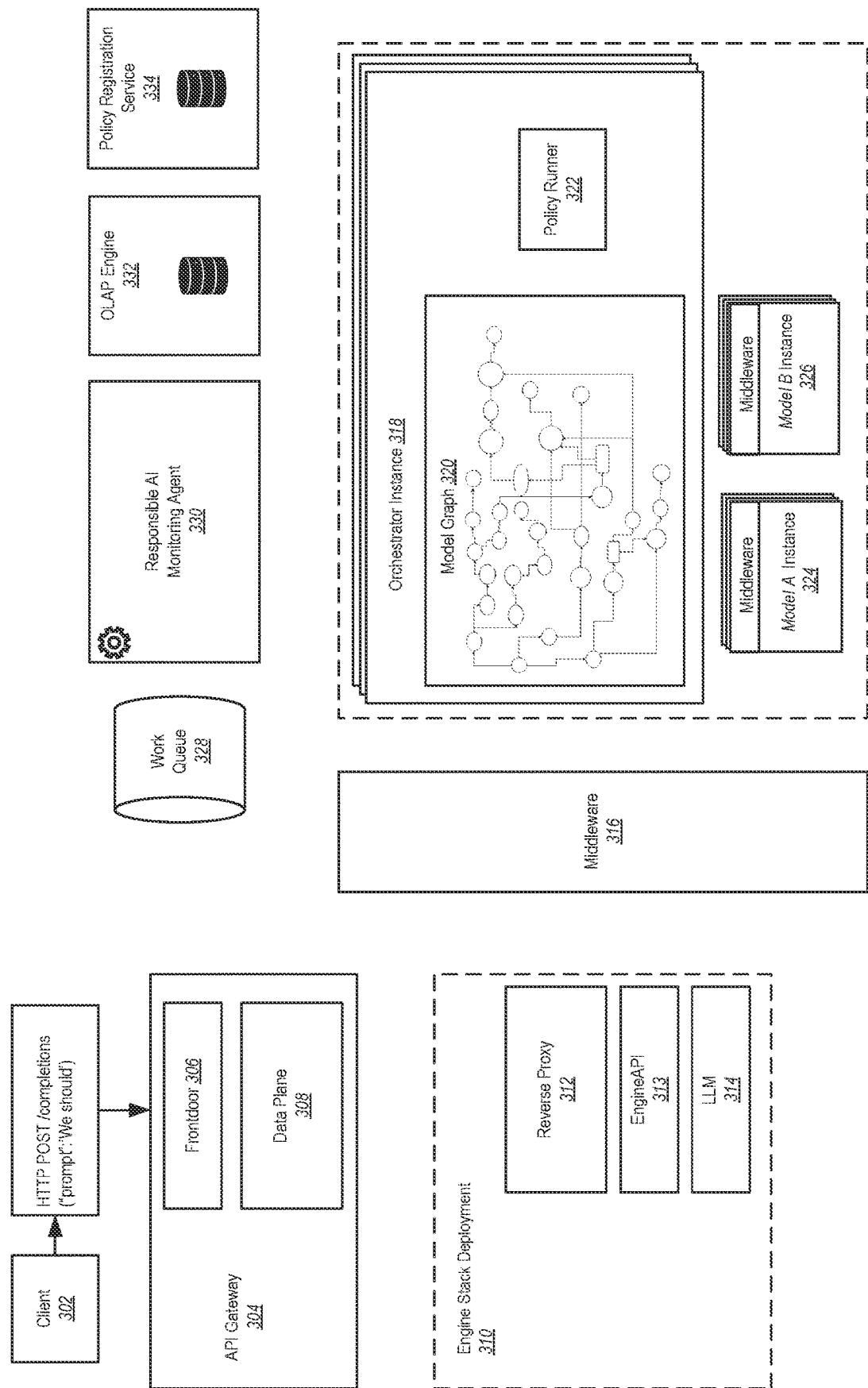

Attention will now be directed to FIG. 3, which illustrates a computer architecture is shown comprising a client 302, a cognitive services gateway tier (e.g., API Gateway 304), a front door 306, and data plane 308. The front door 306 allows data traffic to enter through the API Gateway 304. The data plane 308 is configured to proxy API requests, apply policies, and collect any data needed for the requests. The client 302 provides an initial prompt to the system, (such as "We should") which is then routed through the routing logic of the data plane 308 to the engine stack deployment 310 (see FIG. 4).

As shown in FIG. 4 for example, the engine stack deployment 310 comprises a Reverse Proxy 312 (e.g., representative of content moderation proxy 201) and an Engine API 313. In some instances, the engine API is configured to communicate/connect with an LLM 314, such as ChatGPT. While the LLM 314 is shown as part of the engine stack deployment 310, the LLM 314 may also be external to the engine stack deployment 310 and may even include models and nodes referenced by the model graph 320.

Once the initial prompt is received by the Reverse Proxy 312, it is routed through the Engine API to the LLM 314. The reverse proxy 310Reverse Proxy 312, in some instances, is a reverse proxy for data moderation configurations. The reverse proxy 310Reverse Proxy 312 is also referred to as a content moderation proxy (CMP). The LLM 314 is then applied to the initial prompt for processing by the LLM to generate output corresponding to the initial prompt.

Attention will now be directed to FIG. 5. As shown, after the initial prompt is processed by the LLM 314, the LLM generates output based on the initial prompt. For example, as shown in FIG. 5, LLM 314 generates output (i.e., an intermediary or completion of the initial prompt) comprising "We should break your lamp," which is a prediction of what should follow "We should" included in the initial prompt. This output comprising an intermediary prompt or completed prompt is then routed back through the Engine API 313 to the Reverse Proxy 312.

Figure 6:
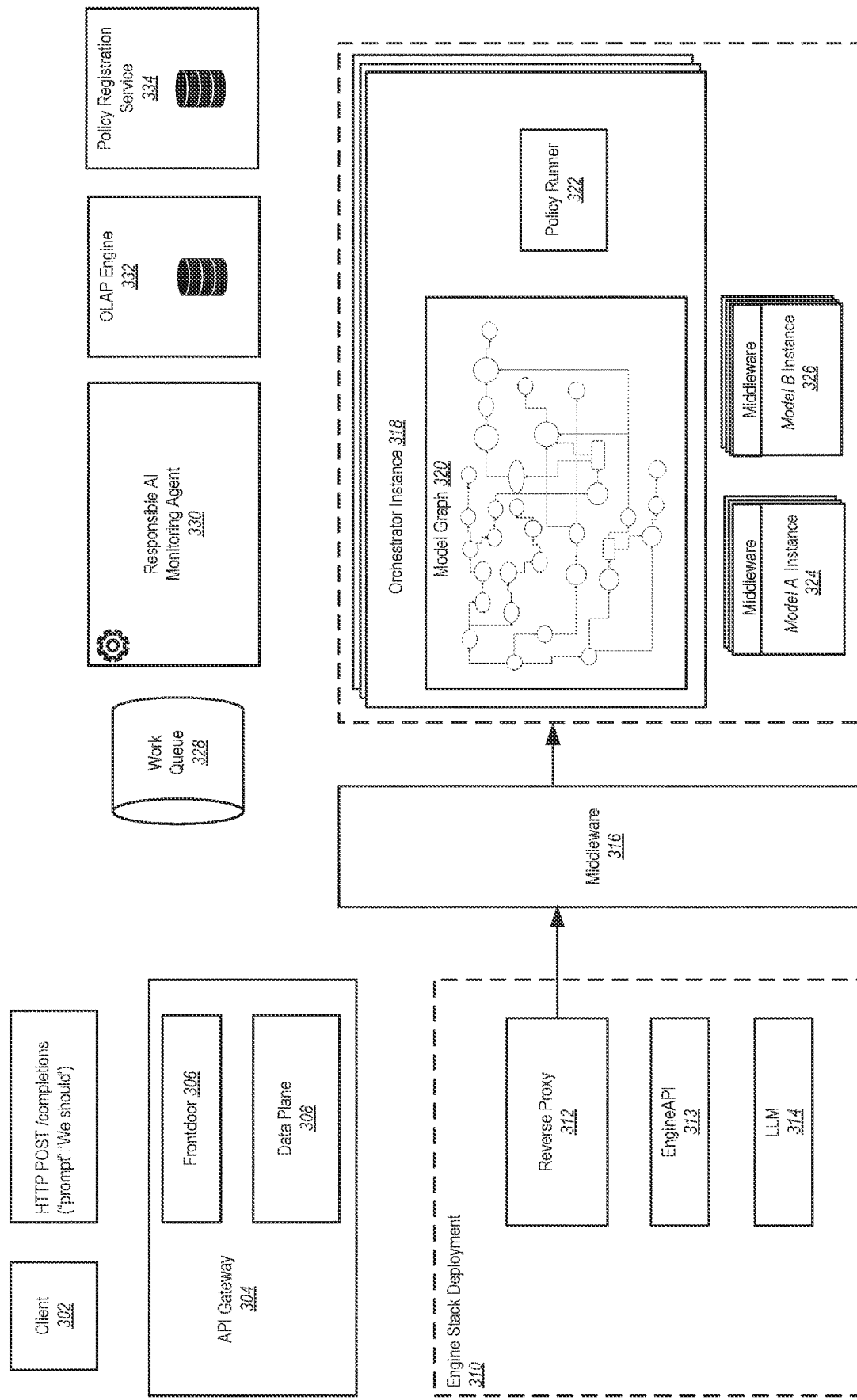

Now, as shown in FIG. 6, the prompt output is routed through arbitrary middleware (e.g., middleware 316) to the Orchestrator 318 for processing based on content moderation and policy compliance. The middleware 316 is used as a service layer in front of the processes executed by orchestrator 318, such as authentication, load balancing, service discovery by DNSDNS, DDOS prevention, etc. As shown, an instance of the orchestrator 318 is generated for the received output from the Reverse Proxy 312. In some instances, the orchestrator 318 is configured as an RAI orchestrator. In this regard, a different orchestrator instance and corresponding model graph instance can be created for each prompt or prompt segment that is processed, as described in more detail below.

As shown, the Orchestrator 318 comprises a model graph 320, which is configured as a content moderation graph or policy compliance graph.

Model graph 320 is representative of model graph 116 of FIG. 1. Additionally, model graph 320, as shown in FIGS. 3-7 is further illustrated in more detail in FIG. 15. The model graph 320, as shown in FIGS. 3-13, is both a library of functions and an actual usage of the library of functions. During some data processing requests, multiple orchestrator instances are generated and executed concurrently/in parallel with each other.

Figure 7:
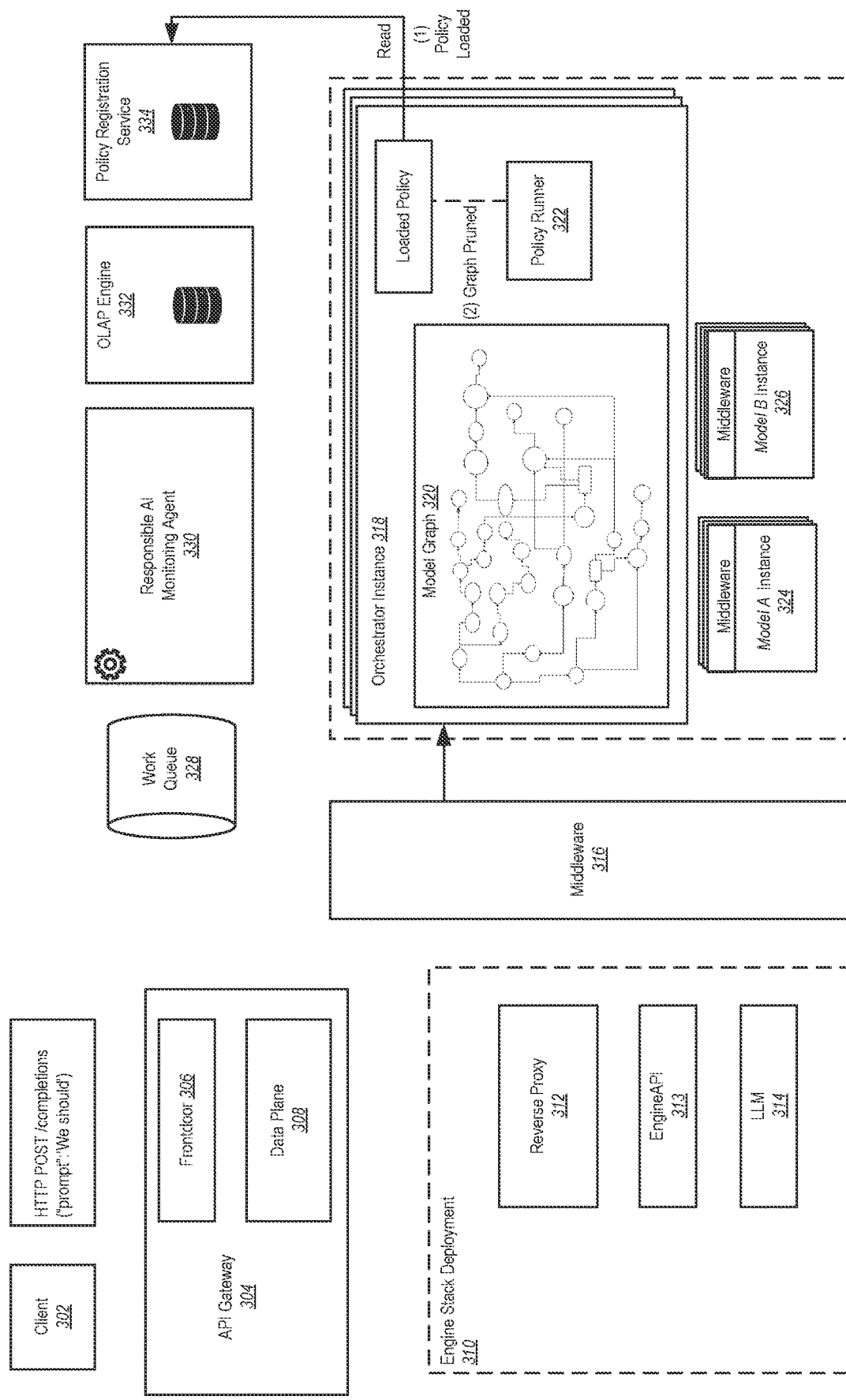

Attention will now be directed to FIG. 7. Once an instance of the orchestrator is generated, the system identifies a policy (i.e., specification information for how to prune the model graph 320), such as by using the policy runner 322.

The policy runner 322 helps to facilitate data transmission between the policy registration service 334 and the orchestrator 318. For example, a policy is loaded from the policy registration service 334. This policy (i.e., loaded policy) dictates how the system prunes the model graph 320) included in the orchestrator 318. The model graph 320 is compiled at run-time.

In some instances, policies are pre-registered by checking in code to a shared repository (e.g., policy registration service 334). The policy runner is then able to apply one or more of the registered policies on the synchronous path through the model graph 320. The policy runner selects which type of policy to evaluate in the model graph 320 by knowing the context of which user, tenant, or application object the request belongs to. A principal-to-policy mapping function can be used to map the authenticated identity of the principal (e.g., user) to which policy type to apply or facilitate an instance of a user-defined policy for further configuration. Alternatively, a policy is identified based on policy information included in the output received at the orchestrator 318 from the Reverse Proxy 312.

Figure 8:
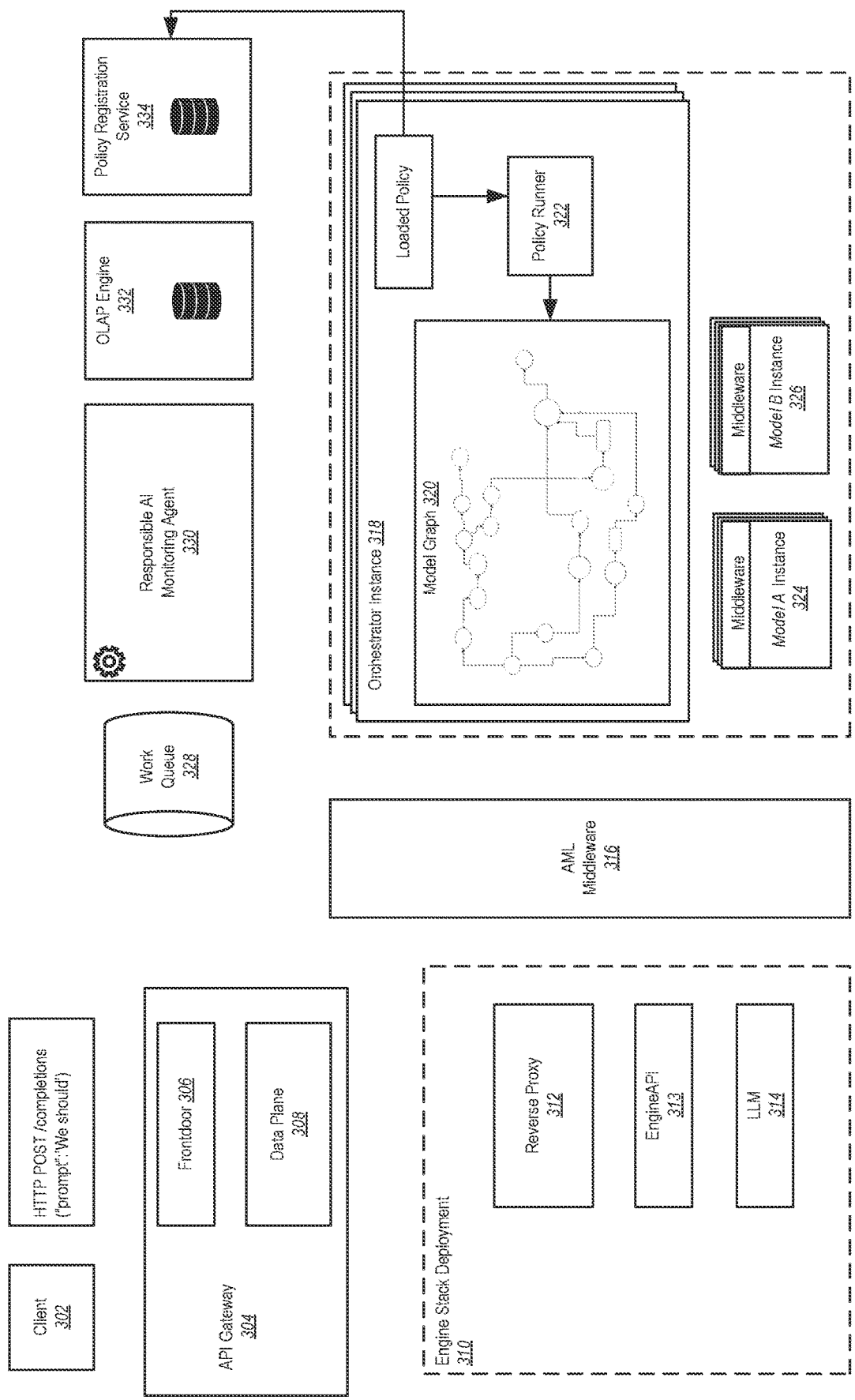

Attention will now be directed to FIG. 8, which illustrates how the model graph 320 is pruned according to the loaded policy. During the pruning process, one or more nodes of the model graph 320 are omitted from the instance of the model graph according to the policy information identified in the loaded policy. In some instances, the policy is associated with a particular subset of labels identified from a global label schema associated with the model graph 320.

As shown in FIG. 8, several nodes and edges of the model graph 320 have been pruned away, as compared to the model graph 320 represented in FIG. 7. Model graph 320, as shown in FIGS. 8-13, is further illustrated in FIG. 17. It should be appreciated that the pruning process referred to in FIG. 8 (e.g., "(2) Graph Pruned") is representative of the pruning process further described in reference to FIGS. 14-17.

Figure 9:
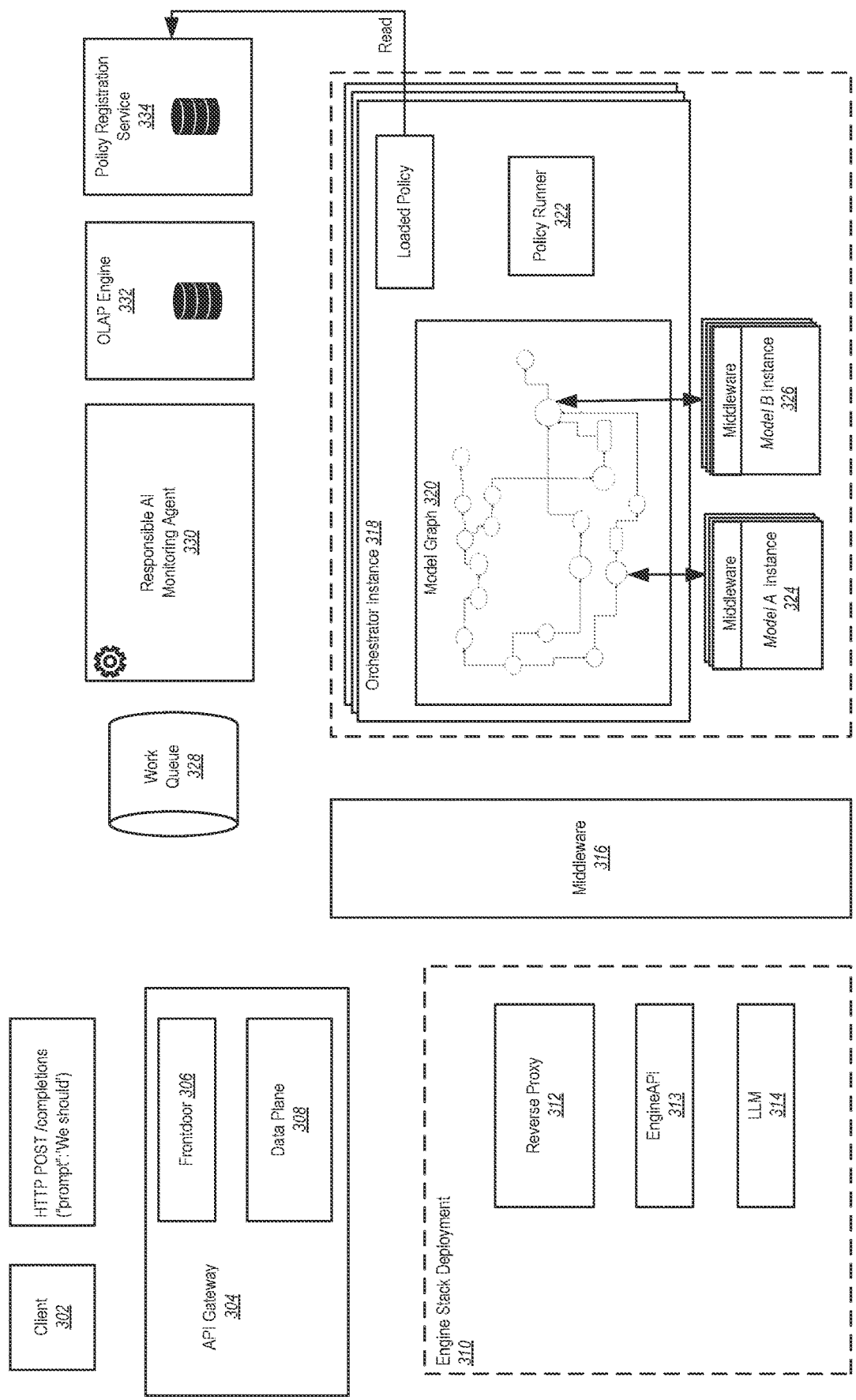

Attention will now be directed to FIG. 9. The output ("We should break your lamp") (which was generated based on the input prompt comprising "We should" from client 302; see FIGS. 3-5) routed from the Reverse Proxy 312 is processed through each node of the model graph 320. For example, as shown in FIG. 9, a node is configured to call an instance of a particular model (e.g., Model A Instance 324) through the middleware 316. In some instances, one or more nodes are configured to execute logic or apply a function to the input data. Examples of logic that may be executed include pattern matching, such as n-gram matching, block lists, or regular expressions. Some pattern matching is also executed with a Trie data structure, where each TrieNode is a group of similar patterns, for example, a bigram, regex, or wildcard. Some models are local neural networks or lightweight alternative classifiers such as random forest and decision trees, Bayes nets, or regressions. Such models are configured for tasks such as deciding whether a portion of the data stream is an obvious positive case so that downstream models that provide additional analysis or increased accuracy in predicting the positive case are not invoked. Additionally, or alternatively, one or more nodes are configured to invoke a remotely hosted model and/or are configured to invoke a locally hosted model. Such models may include neural networks or other machine-learning models which are configured for language identification. In such instances, the result can be a label that is then fed into downstream model nodes as an intermediate label that will determine to which remote endpoint the request will be marshaled (e.g., English hate speech remote endpoints may be different from remote endpoints for other languages).

In some instances, systems utilize a real-time event-driven topological sort to process the data prompt. Event-driven topological sort scheduling is used to execute each instance of the graph that is generated. This allows the system to maximize parallelism in the graph execution and ensures that the graph execution is completed as quickly as possible. This allows for reduced latency, especially during real-time streaming applications. This improves the user experience by providing moderated content back to the user with increased time efficiency. Event-driven topological sort is an algorithm that allows the system to determine which nodes are ready to be executed. Those nodes which are ready to be executed are executed as soon as possible during processing a particular data processing request. When a node is successfully executed and returns its output, the system marks the node complete, and the topological sort algorithm continues for the particular data processing request.

Output from the called model instance is returned to the model graph 320 (as indicated by the reciprocal arrows between Model A Instance 324 and the associated node in the model graph 320. Output from Model A Instance 324 continues to be processed through the different nodes of the content moderation graph (e.g., a node calls an instance of Model B 326).

Figure 10:
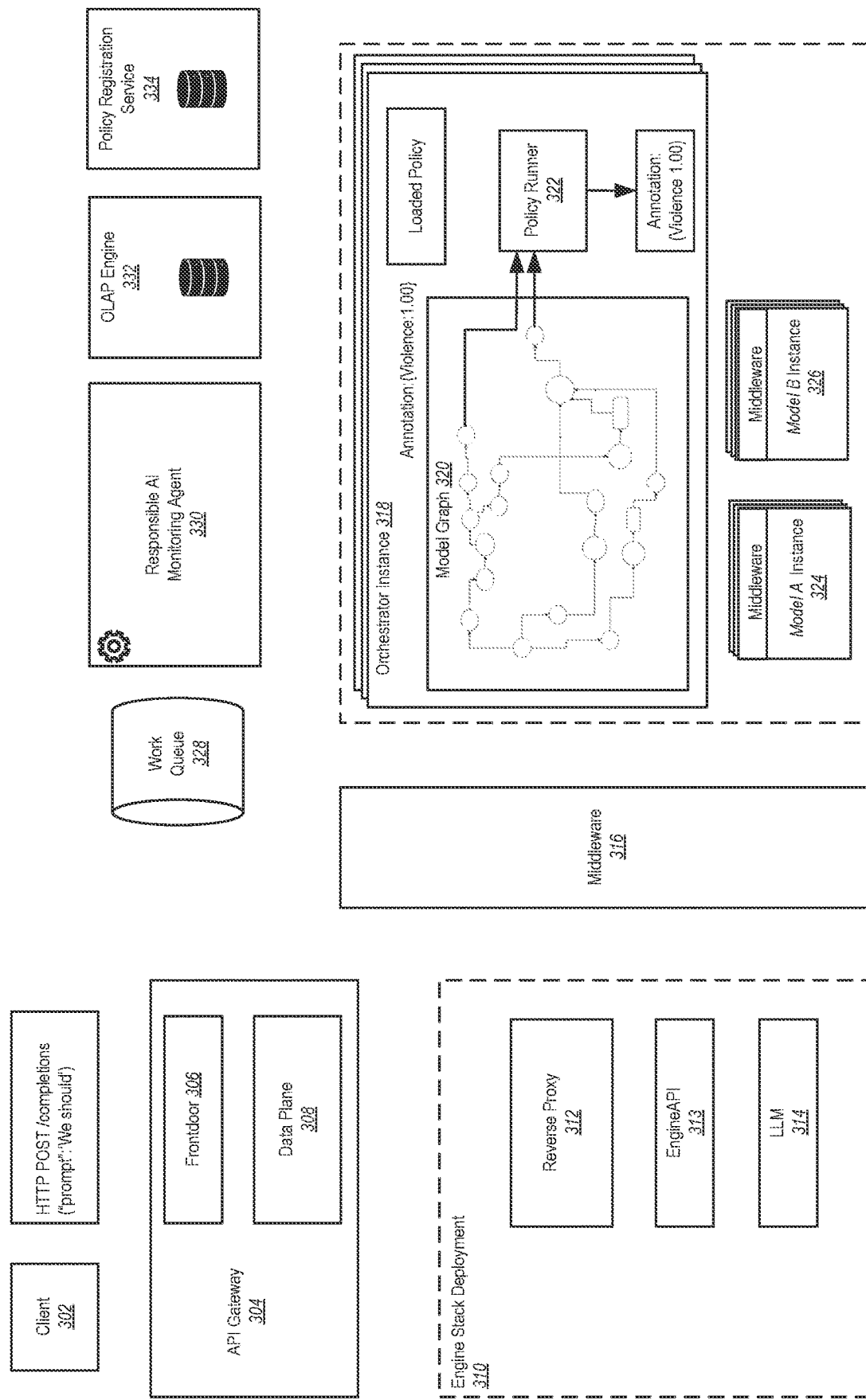

Attention will now be directed to FIG. 10. After the LLM output is processed through the entirety of the model graph 320, the system outputs one or more values for one or more different labels that categorize, filter, and flag content within the LLM output to the policy runner 322. For example, as shown in FIG. 10, the model graph 320, routed through the policy runner 322, returns a value of 1.00 under the Violence label for the LLM output comprising "We should break your lamp." In some instances, this value is configured as an annotation to the LLM output (e.g., a completed prompt or intermediary prompt generated by the LLM 314 in response to a preceding input prompt processed by the LLM 314).

Figure 11:
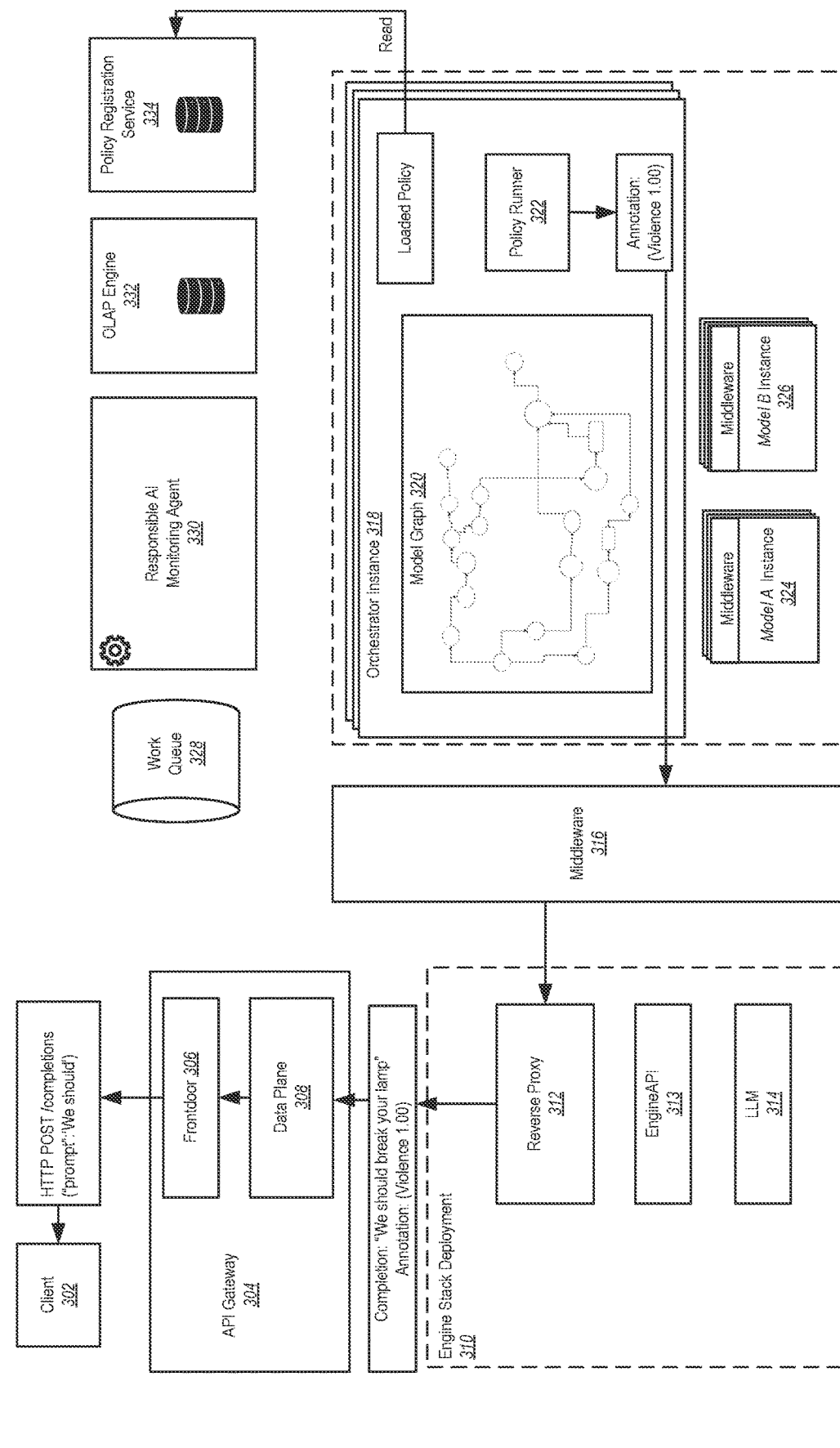

Attention will now be directed to FIG. 11. As shown, the annotation (e.g., Violence 1.00) is appended to the LLM output ("We should break your lamp.") This modified/annotated prompt is returned back to the client 302 by the Reverse Proxy 312 after being routed through the middleware 316 by the orchestrator 318.

Figure 12:
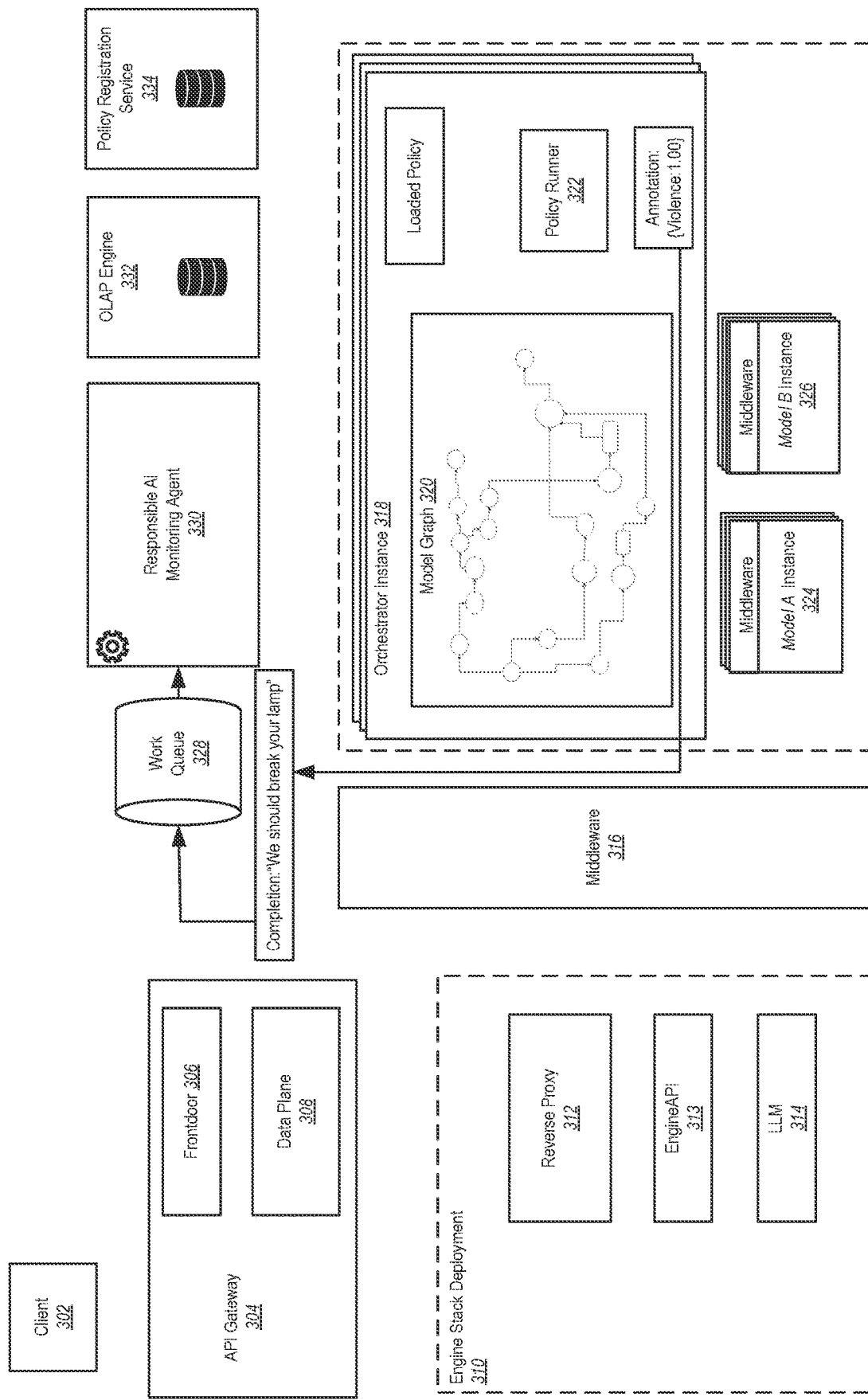

As shown in FIG. 12, the LLM output, along with the label value (i.e., an RAI annotation) is also routed from the Orchestrator 318 to the Responsible AI Monitoring Agent 330 through the work queue 328, which caches and stores samples, which caches and stores samples, like the moderation inference results and/or optionally a correlation identification for joining back to the prompt or completion text, for additional monitoring and potential follow up. The inference results can be recorded as logged events and/or returned to the system that initially generated the request, or user-facing system, on the real-time request path. Logged results can be further processed in downstream pipelines using online analytical processing (OLAP) methods, for example for pattern recognition, or in the moderation example, for detecting abusive users.

Referring to FIG. 13, the label value (e.g., Violence:1.00) is returned to Alert Engine 332 which is configured to generate an alert notification that indicates that the LLM output includes flagged content that may violate a predetermined policy. This alert can be passed to the client or to system administrators to address undertrained models, inappropriate usage of models, or other label-valued content.

It will be appreciated that this computer architecture, and more specifically, the model composite can comprise any configuration of a meta-model topology and corresponding model graph to perform various functions, including but not limited to policy compliance and content moderation.

By implementing systems in the manner described above, results (e.g., intermediary prompts and completed prompts) processed by a machine learning model, such as an LLM or ChatGPT type model, are analyzed, annotated, tagged, and/or modified prior to returning the results to the client-facing system (i.e., the user who submitted the request/prompt). The reverse proxy is configured to facilitate the results return between the LLM and the moderation service. When a prompt is flagged as containing policy-violating content, it may prevent any output from the LLM or other model from being routed to the client.

Moderating Model Graphs

Figure 14:
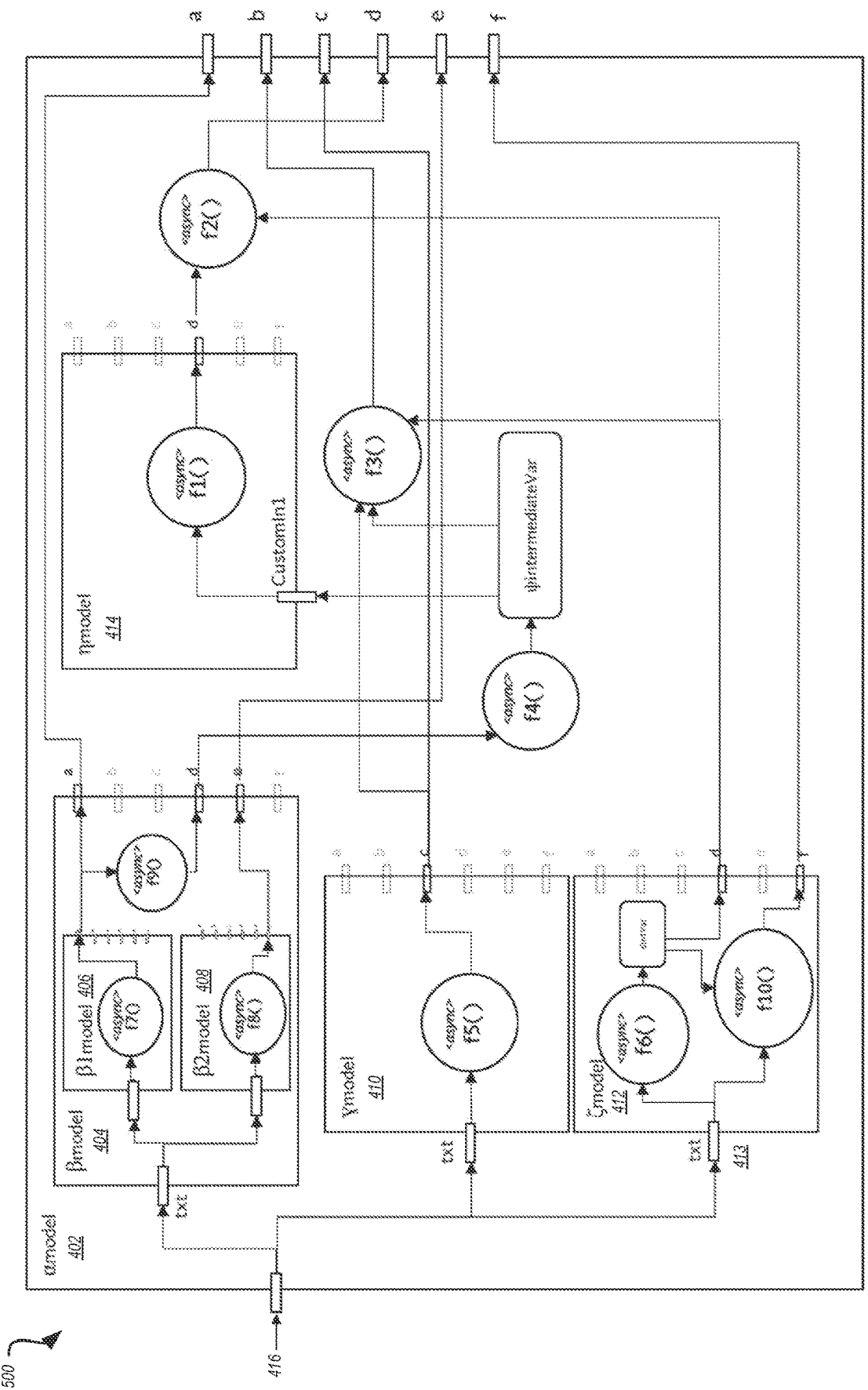
FIGS. 14-17 illustrate an example process for generating and pruning an instance of a model graph converted from a meta-model topology.
Figure 15:
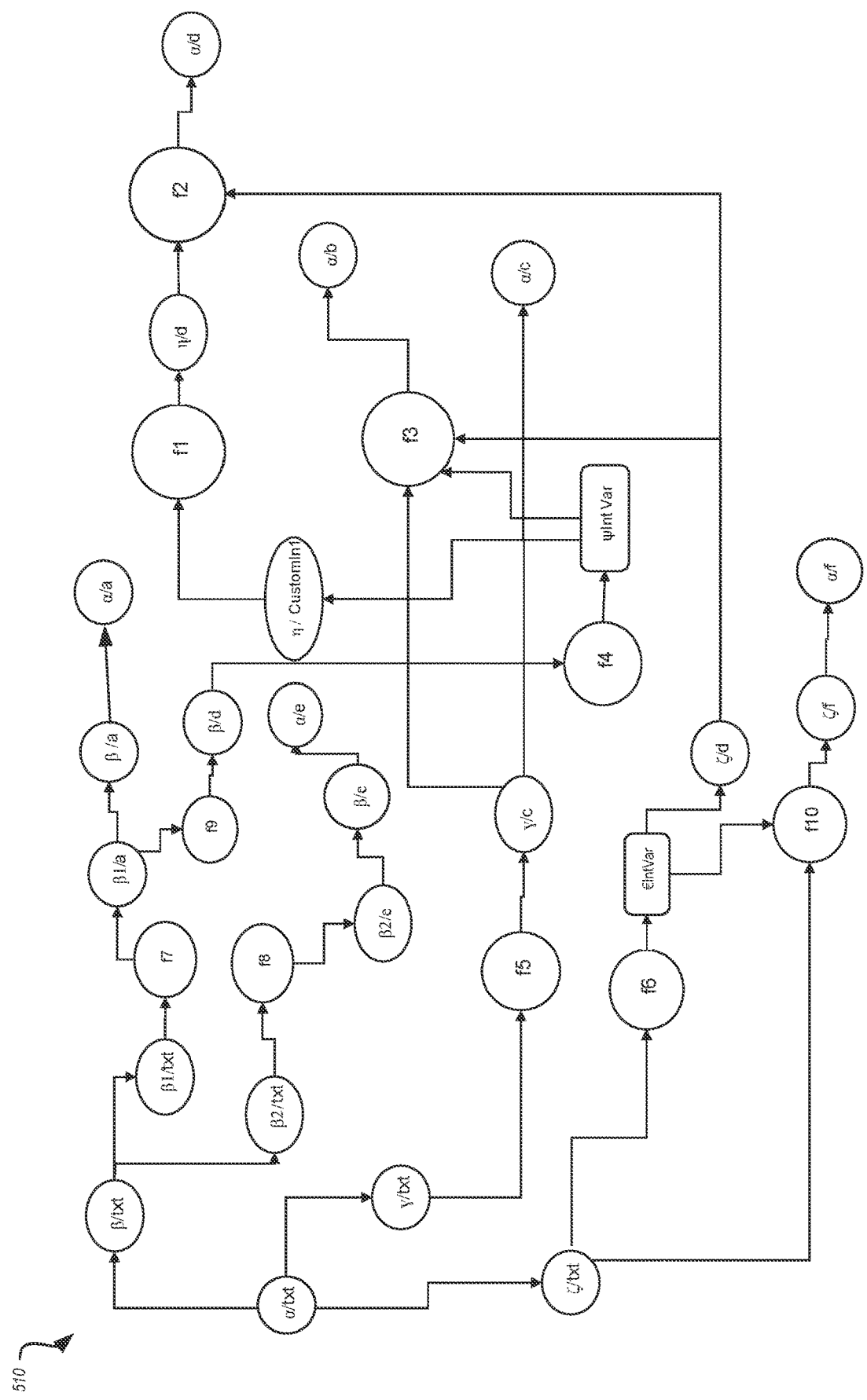
Figure 16:
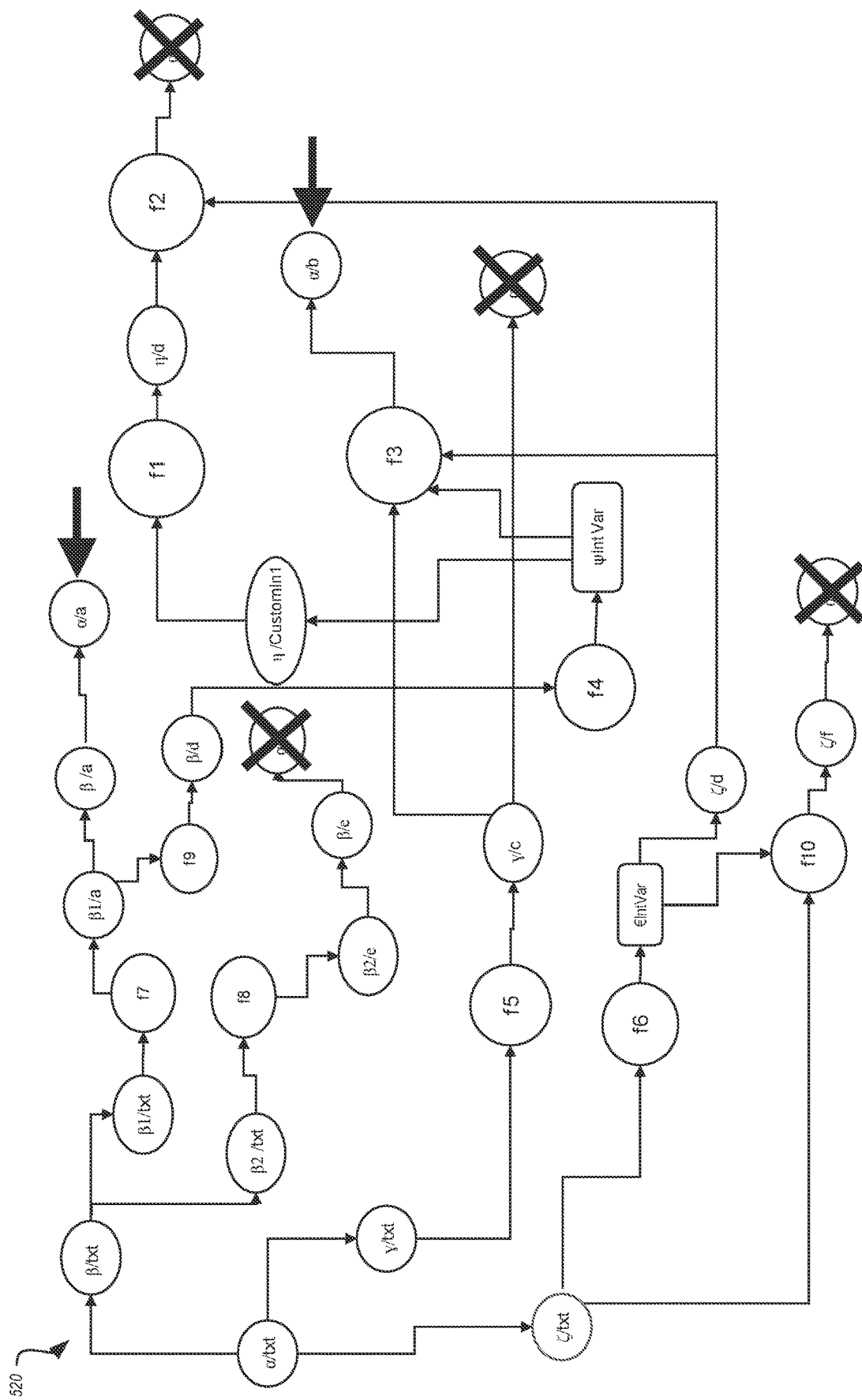

Attention will now be directed to FIGS. 14-16, which illustrate an example process for generating and pruning a content moderation graph from a meta-model topology.

FIG. 14 illustrates a meta-model topology 500 comprising a plurality of functions and models. Once the system identifies a plurality of functions and models, the system organizes the functions and models according to various levels and groupings. For example, the first level comprises an alpha model 402 which has an input data point 416 and one or more output data points (e.g., output a, output b, output c, output d, output e, and output f). Alpha model 402 is shown to have a plurality of models and functions organized at different sub-levels. For example, alpha model 402 (at the secondary level of the meta-model topology 500) comprises beta model 404, gamma model 410, zeta model 412, and eta model 414, along with several additional functions within the alpha level: function f2( ), function f3( ), function f4( ), and an intermediate variable.

Beta model 404 comprises a plurality of models and functions at a third level, including beta1 model 406, beta2 model 408, and function f9( ). Beta1 model 406 comprises function f7( ) and beta2 model 408 comprises function f8( ). Beta model 404 is shown as having an input data point 405 and a plurality of outputs (e.g., output a, intermediary output d, and output e).

Gamma model 410 comprises function f5( ) at the third level of the meta-model topology, which generates output c based on input received at input data point 411. Zeta model 412 is shown receiving input data at input data point 413 which is routed to function f6( ) and function f10( ). Output from function f6( ) is also routed through a zeta intermediate variable to generate output d. Output from function f6( ) is additionally routed through the zeta intermediate variable as input to function f10( ). Function f10( ) then generates output f. Eta model 414 is configured to receive input data at input data point 413 which is then routed through function f1( ) to generate intermediary output d.

At the alpha or top level of the meta-model topology 500, output a is directly routed from output a generated by beta model 404. Output b is based on the output generated by function f3( ). Output d from beta model 404 is routed to function f3( ) as input through function f4( ) and an intermediate variable. Output c from gamma model 410 is also routed to function f3( ) as input. Output d from zeta model 412 is also routed to function f3( ) as input.

Output c is directly routed from output c generated by gamma model 410. Output d at the alpha level is based on output d from eta model 414 and output d from zeta model 412 which are both routed through function f2( ) as input. Output e is directly routed from output e from beta model 404. Finally, output f at the alpha level is routed directly from output f generated by zeta model 412.

In some instances, the different models and functions are organized according to what type of modality they are configured to receive as input data. For example, beta model 404, gamma model 410, and zeta model 412 receive text-based inputs while eta model 414 receives custom input. In other examples (not illustrated in FIG. 14), beta model 404 may receive image-based input, while gamma model 410 receives audio-based input and zeta model 412 receives text-based input. Alternatively, beta model 404 may receive multi-modality input, where beta1 model 406 receives the video-based portion of the multi-modality input and beta2 model 408 receives the audio-based portion of the multi-modality input.

In some instances, each model at the secondary level (e.g., beta model 404, gamma model 410, zeta model 412, and eta model 414) corresponds to a particular label of interest. For example, beta model 404 may correspond to hate speech, gamma model 410 may correspond to violence, zeta model 412 may correspond to sexual content, and eta model 414 may correspond to personal identifying information (PPI). In such a configuration, beta model 404 generates at least two different label values for hate speech, namely a binary hate speech label from beta1 model 406 and a severity level hate speech label value from beta2 model 408.

Gamma model 410 generates at least one label value for violence (e.g., a binary label value). Similar to beta model 404, zeta model 412 generates at least two different label values for sexual content, including a binary label (e.g., output d) and a severity level output (e.g., output f). Similar to gamma model 410, eta model 414 generates at least one label value for PPI including a binary label value (e.g., intermediary output d). It should also be appreciated that the functions and models may be organized according to a combination of labels of interest groupings and modality groupings.

Contributors can add their models to the system by authoring a subtype of model class and registering their code to a globally shared repository. The contributor defines the model by specifying the following: typed declaration of any inner models, which outputs of the global label schema are intended to be enabled (these outputs can be nullified if it a timeout or other exception occurs), and any additional inputs beyond the input text. Adaption on inputs can be done inside functions included in the model. The contributors also specify how outputs are derived from inputs, inner model outputs, and/or intermediate variables. These range from simple pass-throughs to complex logic instantiating scientific libraries. Specifications are also defined for how intermediate variables are derived from inputs, inner model outputs, and/or intermediate values, along with how inner model inputs are derived from inputs, inner model outputs, and/or intermediate variables.

Some examples of these models include a neural net classifier with binary classification for hate speech which generates a single-dimensional output. The classifier is task-specific. Accordingly, the global label schema 119 will include a binary "Is_Hate_Speech" label for which the label value will comprise a probability or likelihood that the content is hate speech. The classifier's output maps directly to this label, while all other labels are disabled. In other words, this label is the only label that is enabled out of the global label schema 119.

Another example of a model includes a profanity guard list with a hard-coded function that outputs a regression score based on weights and frequencies of terms. However, assuming the global label schema only includes labels "Profanity_Light" and "Profanity_Extreme," the contributed model subtype will define the code needed to adapt the regression score to the labels.

In some instances, a model in the framework is considered a stub, placeholder, handle, or marshal for one or more underlying predictive models. Most heavy models, including neural classifiers and regressors, will involve a service-to-service call. These calls are undertaken by the functions defined within the model hierarchy, which the framework treats asynchronously. In some instances, the heavy models are hosted by an AML hosting platform, which can be co-deployed with the graph library. As a note, the system can do remote dispatch inside the model functions. In some instances, the graph library is instantiated inside of the orchestrator, such that the heavy models may be hosted by a dedicated platform whose continuous deployment workflows are shared with the orchestrator.

A model in the meta-model topology 500 may invoke multiple underlying model endpoints. Contributed functions are configured to adapt the underlying model outputs to the labels in the global label schema. In contrast to heavy models, lightweight work and remote dispatch can be performed within contributed models inside the models themselves.

This work is performed on an orchestration thread pool. Underlying models that are lightweight, such as shallow neural networks, guard lists, and non-neural methods can be executed directly in the framework-level functions.

Each model specification will also define timeouts and provide cancellation for remote invocations. These exceptions will nullify enabled outputs. There will be null propagation when one of a node's inputs is null. In this manner, the non-null paths are also still propagated through the graph allowing some of the non-null labels to still be generated even when timeouts or other null exceptions occur.

Attention will now be directed to FIG. 15, which illustrates an example embodiment of a model graph 510. Once all of the models and functions have been organized according to their different levels, groupings, and dependencies, the system converts the meta-model topology 500 to a model graph 510.

Model graph 510 comprises a plurality of nodes and a plurality of edges, wherein each function of the plurality of functions from the meta-model topology 500 is represented as a node within the model graph and wherein each edge of the plurality of edges that connects at least two nodes in the model graph represents a data dependency between different functions of the plurality of functions in the meta-model topology 500.

When a data processing request is received to process a data prompt, the system generates an instance of the model graph, as shown in FIG. 15. The instance of the model graph can then be pruned to omit nodes that are not relevant to the data prompt. For example, systems identify one or more labels of interest for which to generate label values based on the data prompt. Based on the labels of interest that are identified, systems are then able to identify a subset of nodes selected from the plurality of nodes in the model graph associated with one or more labels of interest. Prior to applying the model graph to the data prompt, the system modifies the instance of the model graph by omitting one or more nodes of the model graph not included in the identified subset of nodes associated with one or more labels of interest.

The nodes that are not relevant can be identified using a depth-first search. For example, as shown in FIG. 16, alpha output a and alpha output b are identified as the desired outputs (as indicated by the left-point arrows). The system determines that alpha output d, alpha output e, and alpha output f are not relevant (as indicated by the "X" over the corresponding nodes).

Figure 17:
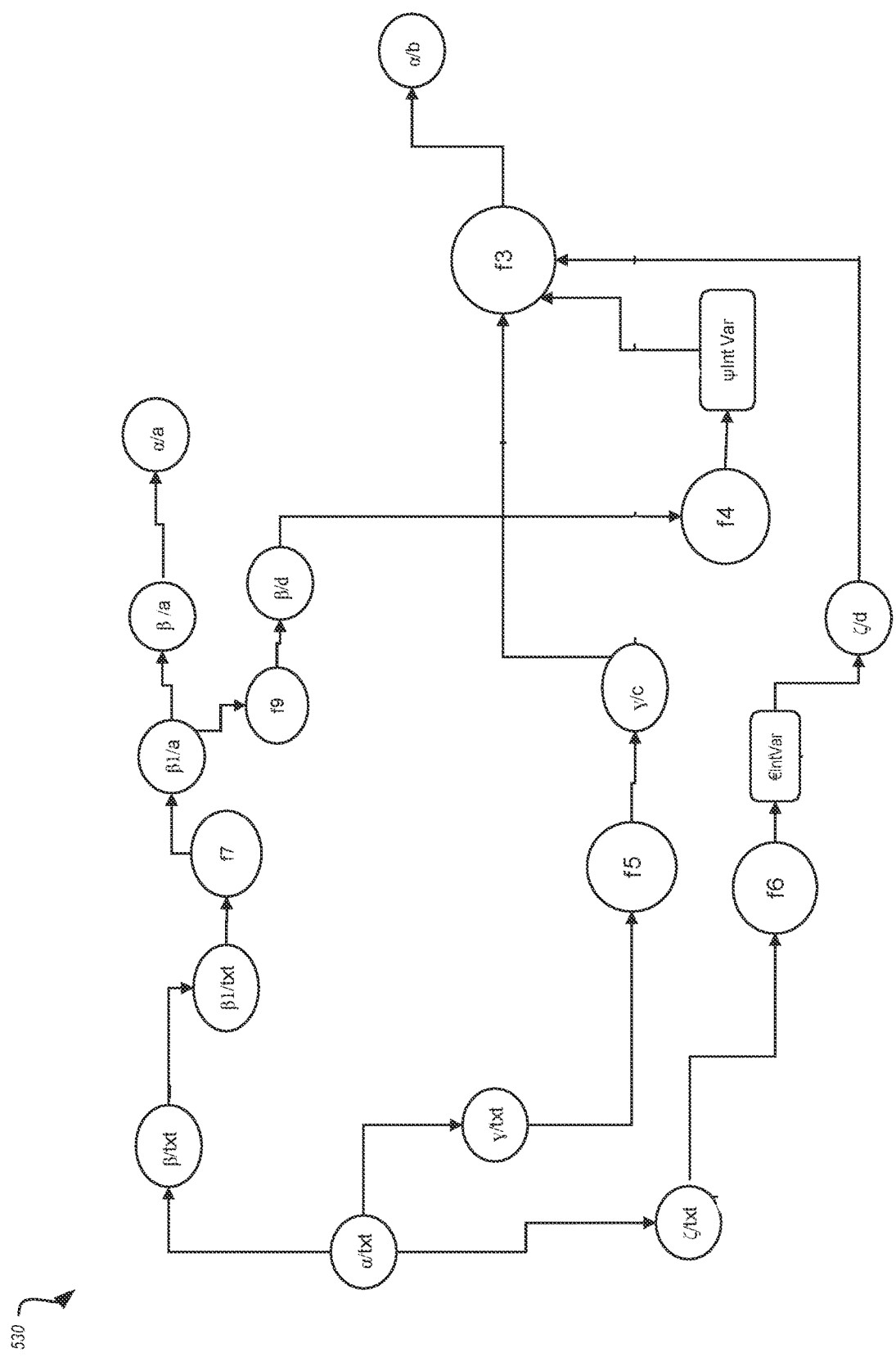

Attention will now be directed to FIG. 17, which illustrates an example embodiment of a pruned instance of model graph 510. As shown in FIG. 17, after the non-relevant output nodes are identified and omitted, the model graph is further pruned to omit any nodes which were preceding the non-relevant nodes in terms of dependency. Thus, once the instance of the model graph is further pruned in this manner, the pruned instance of the model graph (e.g., model graph 530) is ready to be applied to an input data prompt.

Segmentation

Figure 18:
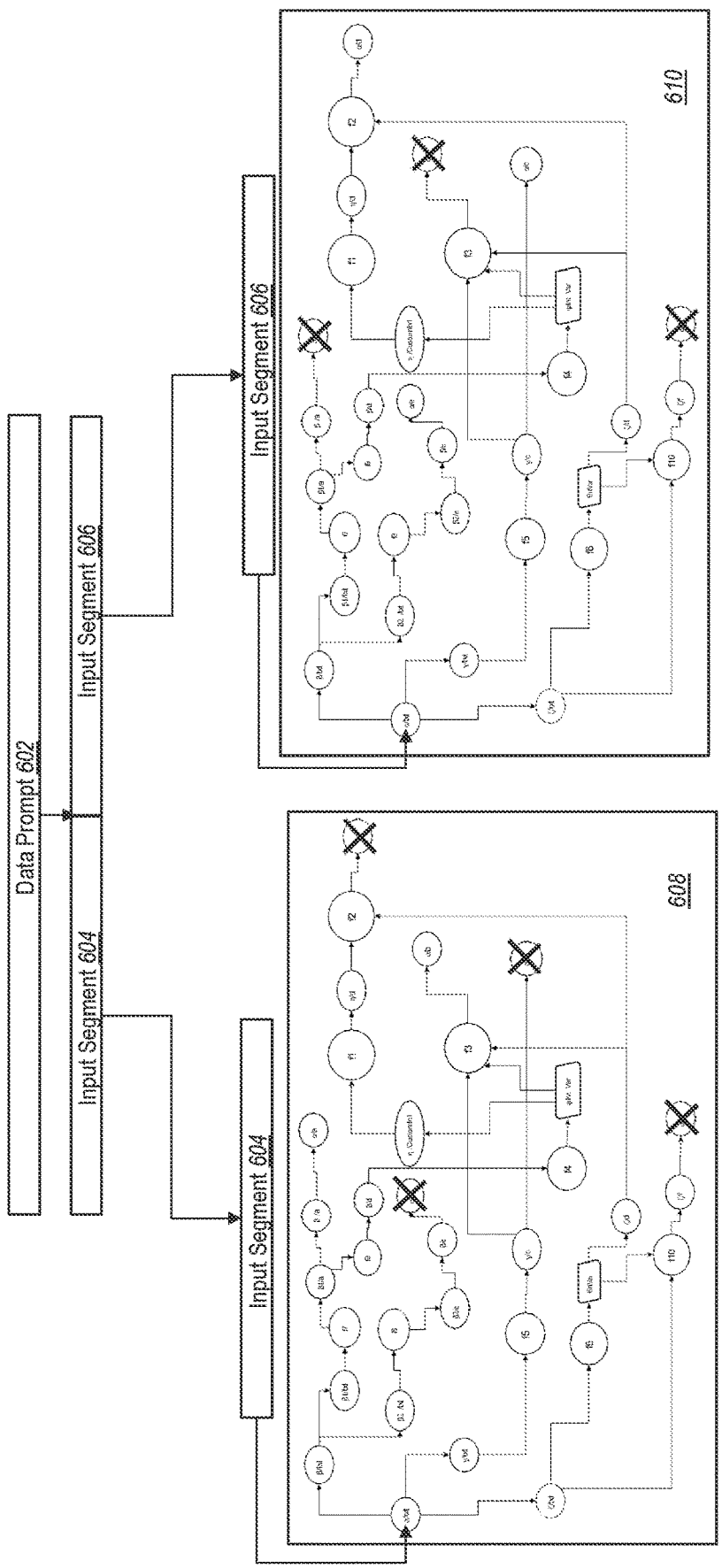
FIG. 18 illustrates an example embodiment for generating and executing multiple instances of a model graph for each segment of a completed prompt.

Attention will now be directed to FIG. 18, which illustrates an example embodiment for generating multiple instances of a content moderation graph (or graph) for each segment of an input prompt, where each instance comprises a differently pruned version of the content moderation graph.

During processing, the system is configured to identify a data prompt (e.g., data prompt 602) and segment the prompt into a plurality of segments (e.g., input segment 604 and input segment 606). Subsequently, for each segment of the prompt, the system generates a separate instance of the graph (e.g., instance 608 and instance 610), wherein an instance of the graph corresponds to a particular segment.

The system then prunes the instance of the graph according to the different policy information for each segment. For example, instance 608 is shown to omit at least four different output nodes, while instance 610 is shown to omit at least three different output nodes. In this manner, the system can generate a customized instance of the graph for each segment, where each instance omits different nodes from the underlying base moderation graph based on different policies applied to different prompt segments.

For example, in a first segment, the policy information may indicate a task for scanning the segment for violent content, while in a subsequent segment, the policy information may indicate a task for scanning the segment for hate speech. By implementing methods in this manner, the system can process the input prompt in a more accurate and precise way because each instance of the graph is tailored specifically to a different segment. Additionally, this increases the computational efficiency because multiple graphs can be running at the same time while also saving on processing memory by only loading those nodes which are most relevant to a particular segment in a particular instance of the graph.

It should be appreciated that, in some instances, each segment is emitted from one or more segmenters after having the data stream sent through the system. The segments are emitted as soon as possible, according to the timing of the processing of the data stream. The data stream is continuous but buffered to generate the segments. A model graph is generated for each segment and fully executed for each segment, via an algorithm such as a topological sort.

By implementing systems in this manner, the systems can achieve the technical benefit of facilitating low-latency streaming processing. For example, the segmenters are configured to handle streaming, as well as non-streaming, data prompts. Thus, some policies are specifically configured to be used in streaming scenarios and will have increased optimization for generating incremental segments. Optimal segments are not too short (i.e., include a sufficient length of tokens to provide context during inference) but also do not require undue buffering. In contrast, non-streaming policies (or segmenters) are configured to select optimal segment delineations. One methodology may include using a rolling window that is sensitive to punctuation or a rolling window that is sensitive to regexes that detect clauses.

Batching

Figure 19:
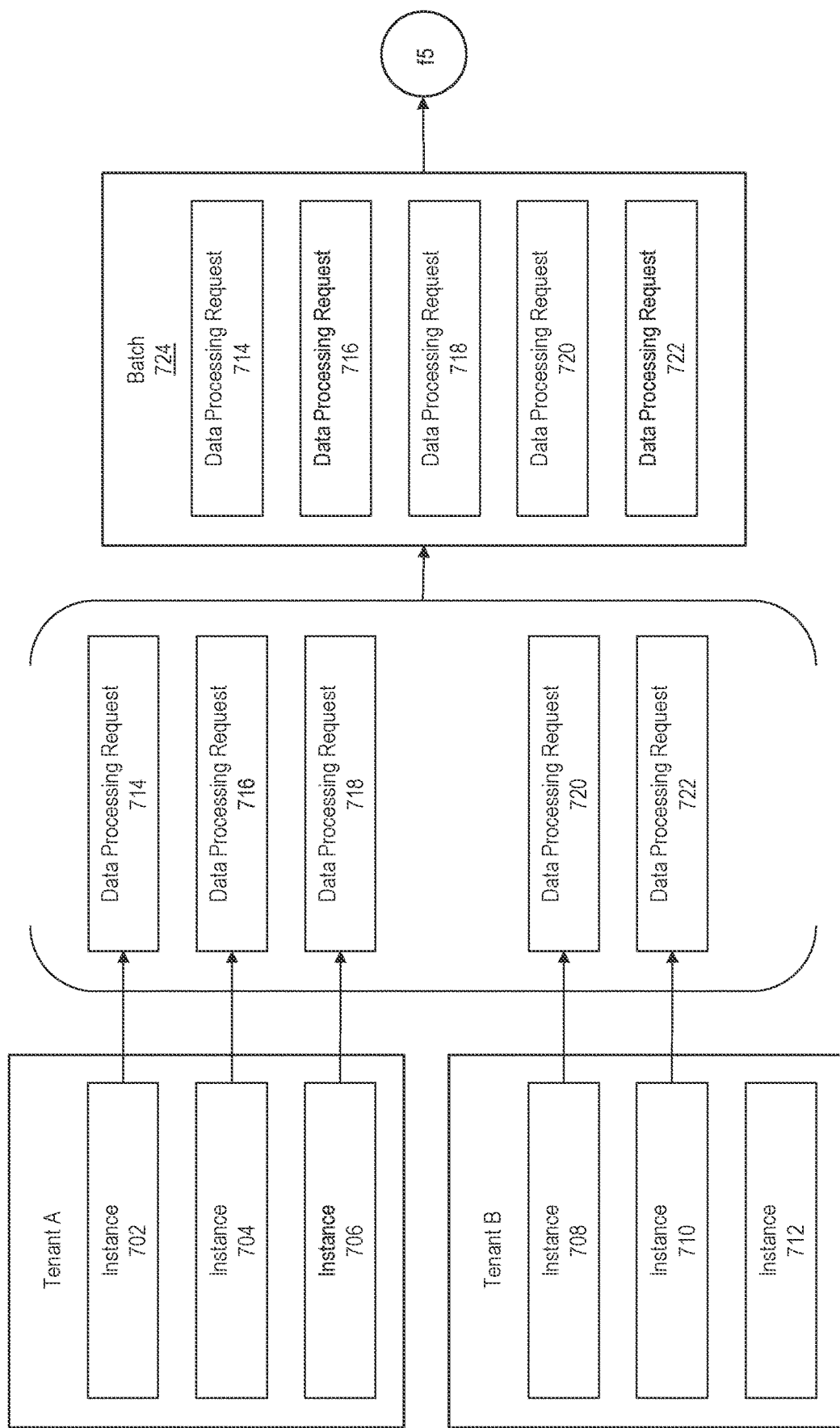
FIGS. 19-20 illustrate an example embodiment for batching data processing requests at one or more nodes of a model graph.
Figure 20:
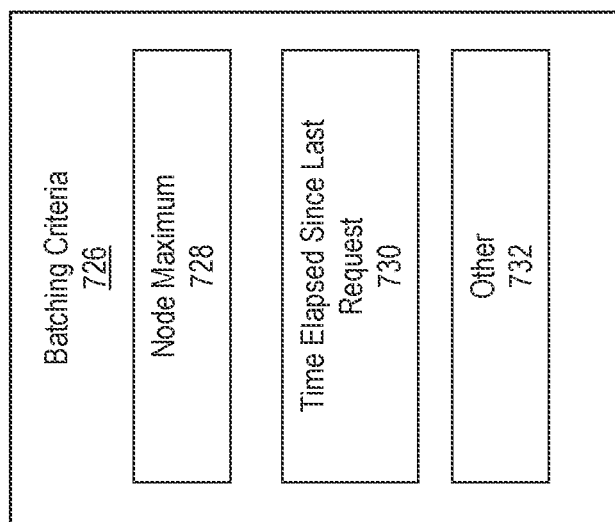

Attention will now be directed to FIGS. 19-20, which illustrates an example embodiment for batching data processing requests at one or more nodes of a model graph, wherein the model graph may be a data moderation graph described above.

FIG. 19 shows a plurality of model graph instances generated for a plurality of tenants. For example, instance 702, instance 704, and instance 706 are shown instantiated for Tenant A, and instance 708, instance 710, and instance 712 are instantiated for Tenant B.

In some systems, each model graph instance is generated for a different data processing request from one or more different users or in response to receiving different data prompts. (In some systems, a single data processing request may comprise one data prompt, or alternatively, a plurality of data prompts). It should also be appreciated that the different model graph instances may also be generated based on the segmentation of the data prompt, wherein each instance is pruned according to policy information associated with each segment of the data prompt. Thus, in some systems, one or more instances of the model graph comprise the same node subset, while one or more instances of the model graph comprise a different node subset.

In order to improve the computing and processing efficiency of the meta-model topology across the plurality of instances shown in FIG. 19, different sets of data processing requests for a particular node are batched together. Efficiencies are realized by reducing the change of states required for the registries of the nodes when different requests are received. In particular, by batching requests together, the node may utilize the same common set of registries when processing multiple requests, thereby reducing inefficiencies that would be required for resetting the registries for each different request if they were received as unbatched individual requests.

As shown in FIG. 19 the system identifies data processing requests for node f5 (e.g., representative of node f5 of FIG. 17) across the plurality of model graph instances from Tenant A and Tenant B. For example, for Tenant A: there is data processing request 714 for node f5 received from instance 702, data processing request 716 received from instance 704, and data processing request 718 received from instance 706. For Tenant B: data processing request 720 is received from instance 708 and data processing request 722 is received from instance 710. At this instance, no data processing request has been received from instance 712 (i.e., instance 712 may have been pruned to omit node f5).

The plurality of data processing requests (e.g., batch 724) is then transmitted and temporarily stored in a batching cache corresponding to node f5. The system identifies one or more batching criteria associated with node f5. For example, as shown in FIG. 20, batching criteria 726 includes a node maximum 728, time elapsed since last request 730, or other 732 batching criteria.

The node maximum 728 indicates the maximum number of data processing requests that a node can process as a single input. This is the threshold maximum queue size of requests for the batch. In particular, the node maximum 728 dictates a maximum number of data processing requests that can be included in a batch queue or cache assigned to a particular node before the enqueued requests are dispatched to the node for processing. Larger batches are hardware-efficient but result in increased latency. Thus, setting a maximum batch size ensures that batches are not so large as to increase the latency to an unacceptable level such that it degrades the user experience, particularly in streaming applications.

The time elapsed since the last request 730 is configured as a timed-out batching criterion, meaning the system will send a batch of data processing requests that includes less than the maximum number of data processing requests if a certain amount of time has elapsed since the last data processing request was received. This prevents the system from incurring delayed or unnecessarily lengthened processing times if/when the batch queue threshold size is not reached in a prescribed time.

Referring back to FIG. 19, the system identifies that node f5 has a node maximum of five batching requests. Thus, once five different data processing requests are received, batch 724 is transmitted to node f5 to be processed.

It should be appreciated that dynamic batching can be performed both inside the framework on the orchestrator process side (e.g., as a feature of the framework) or it can be performed at the remote models (i.e., models that are invoked by one or more functions of the meta-model topology). There are generally many orchestrator processes, each running the graph framework, and many remote model processes for any given remote model. Dynamic batching, therefore, can be applied on the orchestrator side, in which case once the criteria are met, the batch request is transmitted and routed to the remote model. Alternatively, every node in the model graph submits the request to a remote model process and then applies the dynamic batching algorithm in the remote process. Then, once a batch is ready to go in the remote process, the batch is sent through forward inference. Depending on which case of dynamic batching the system is performing, the system will import a different library (e.g., a library configured for an orchestrator-based batching or a library configured for the remote model dynamic batching).

Example Methods

The following discussion now refers to several methods and method acts. Although the method acts may be discussed in a certain order or may be illustrated in a flow chart as occurring in a particular order, no particular ordering is required unless specifically stated, or required because an act is dependent on another act being completed prior to the act being performed.

Figure 21:
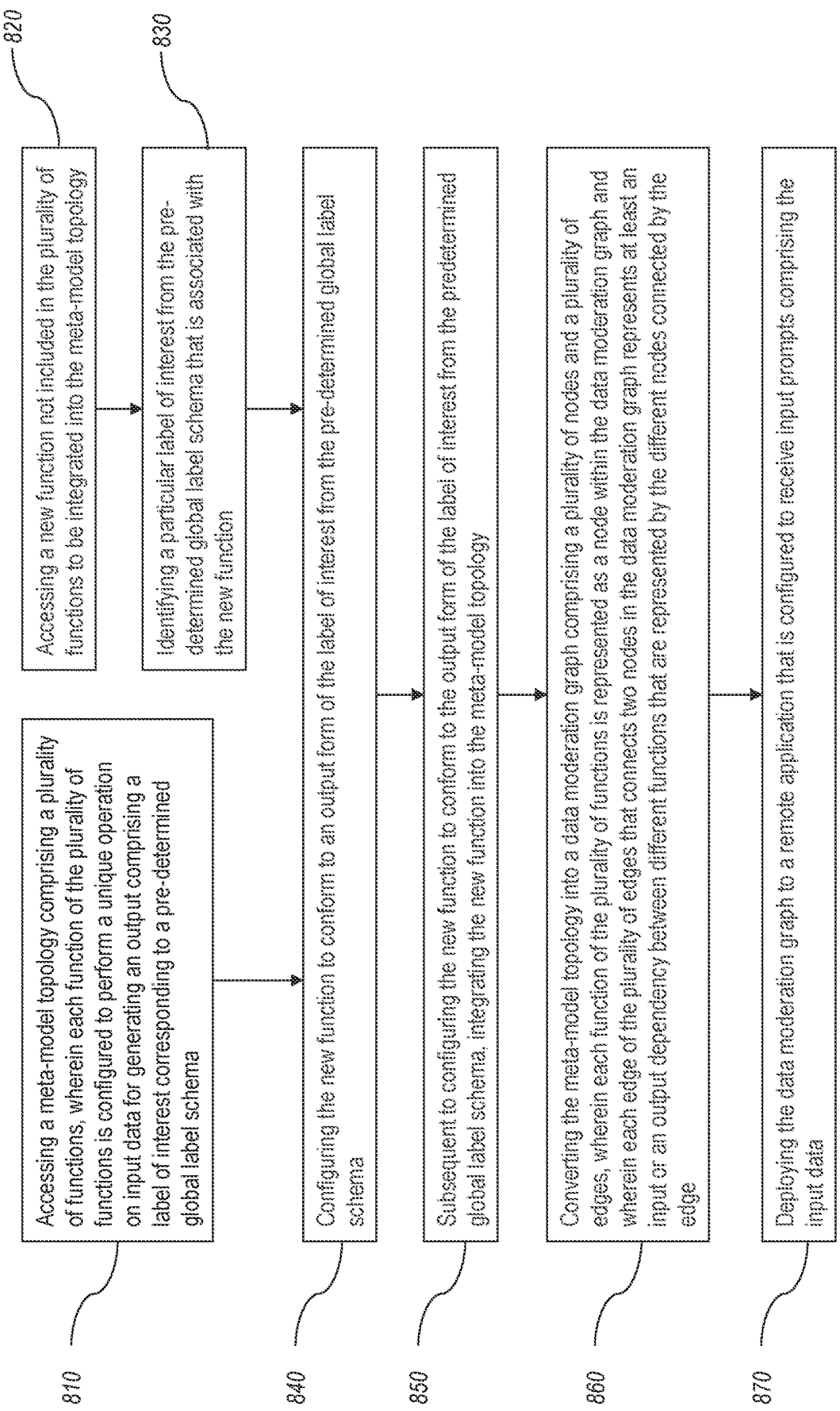
FIG. 21 illustrates an example embodiment of a flow diagram having a plurality of acts associated with methods for deploying a meta-model topology.

Attention will now be directed to FIG. 21, which illustrates an example embodiment of a flow diagram having a plurality of acts (e.g., act 810, act 820, act 830, act 840, act 850, act 860, and act 870) associated with a method implemented by a computing system (e.g., computing system 110) for deploying a meta-model topology and moderating graph generation from the meta-model topology.

The first illustrated act includes an act for accessing a meta-model topology (e.g., meta-model topology 115) comprising a plurality of functions (act 810). Each function of the plurality of functions is configured to perform a unique operation on input data to generate a function output comprising a label value corresponding to a label of interest included in a global label schema (e.g., global label schema 119). A meta-model topology that is configured in this manner beneficially provides a streamlined framework with which to process data prompts. Additionally, because the plurality of functions conforms to the global label schema, output from the meta-model topology (or corresponding model graph) is uniform. Uniform outputs make further downstream analysis or operations more accurate and efficient.

In some instances, systems access a new function not included in the plurality of functions of the meta-model topology (act 820). By identifying new functions to integrate with the meta-model topology, the meta-model topology can be continuously improved, updated, and expanded to provide improved data processing services and be adapted to new applications or domains.

To integrate the new function into the meta-model topology, systems identify a particular label of interest from the global label schema that is associated with the new function (act 830) and configure the new function to conform to an output form of a label value corresponding to the label of interest from the global label schema (act 840). By allowing a new function to be integrated into the meta-model topology, systems can ensure that the meta-model topology is up to date with improved functions and provide additional operations not previously included in the meta-model topology.

Subsequent to configuring the new function, systems integrate the new function into the meta-model topology (act 850). Once the new function is integrated into the meta-model topology, systems then convert the meta-model topology into a model graph (e.g., model graph 116) (act 860).

The model graph comprises a plurality of nodes (e.g., node f1, node f2, node f3, etc. of FIG. 15) and a plurality of edges. Each function of the plurality of functions in the meta-model topology is represented as a discrete node within the model graph. In a similar fashion, each edge of the plurality of edges connects two or more nodes within the model graph and represents a data dependency that exists between different functions in the meta-model topology. For example, in some instances, the data dependency between two different functions is defined by an edge such that the output of one model is used as the input to another model. In some instances, the data dependency between different functions is defined based on which level of abstraction a particular node is located within the model graph. For example, some nodes represent individual functions or models, while other nodes represent a group or collection of models which collectively generate a particular output to be used downstream within the model graph. Some functions are organized according to which label of interest from the global label schema they have been configured to output. Finally, systems deploy the model graph to a remote application (e.g., user interface(s) 122 of client system(s) 120) that is configured to receive data prompts (e.g., data prompts 117) (act 870).

In some instances, the method further comprises acts for using the model graph to process input data. For example, in such instances, systems receive a data processing request (e.g., prompt "We should" of FIG. 3) at the remote application (e.g., client 302). In response to receiving the data processing request, systems generate an instance of the model graph (e.g., orchestrator 318) and apply the model graph to a data prompt corresponding with the data processing request.

The data prompt can be generated in several different ways. For example, some data prompts are generated by a human user. Other data prompts are automatically generated by an artificial intelligence user or another computer user. Additionally, the model graph can be applied to different types of data prompts. Some data prompts are initial prompts that are used as input to a machine learning model, such as a generative pre-trained language model, which then uses the initial prompt to generate a completed prompt. Accordingly, the model graph can also be applied to the completed prompt. Furthermore, it should be appreciated that the data prompt may also comprise any audio-visual content retrieved from one or more external data sources.

In some instances, the method further comprises acts for configuring different functions within the meta-model topology. For example, some systems determine which labels of interest from the global label schema are associated with different functions included in the meta-model topology. For example, the system may identify a set of functions that correspond to a hate speech label included in the global label schema, while a different set of functions correspond to a violence label included in the global label schema. Within a particular set of functions, there may exist certain data dependencies even between functions that correspond to the same label of interest. For example, within the set of functions corresponding to the hate speech label, some functions are configured for binary predictions while some functions may be configured for regressive or scaled predictions (e.g., a severity level).

Those systems then generate one or more subsets of linked functions, wherein each subset of linked functions includes functions that are conformed to generate an output form corresponding to a similar or equal label of interest (see dependency links between models and functions illustrated in FIG. 14). For example, in some configurations, it is beneficial to execute the binary functions first and then increase the granularity of analysis such that the severity level functions are only performed if the binary function outputs a positive probability that the hate speech label should be generated wherein there exists a data dependency between the binary function and the severity level function which depends on the output of the binary function.

Some meta-model topologies comprise a singular input data entry point (e.g., input data point 413), such that a user is enabled to interface with meta-model topology through the singular input point without interfacing with the intermediary outputs generated by individual functions within the meta-model topology. By implementing systems according to such embodiments, the user experience is improved by allowing a user to submit data prompts and retrieve moderated outputs in a streamlined manner since all of the underlying models and data dependencies between models are abstracted away from the user interface.

Some users may wish to update the meta-model topology with a new or improved function that will output a label value for a label of interest not included in the existing global label schema associated with the meta-model topology. In such instances, the systems access a new function that was not previously included in the latest version of the meta-model topology. After identifying a new label of interest associated with the new function, the systems integrate the new function into the meta-model topology and update the global label schema with the new label of interest associated with the new function.

Some new functions that are integrated into the meta-model topology may output a label value for the label of interest that is related to another label of interest that already exists in the global label schema. When the systems determine that the new function is similar to a particular function (e.g., beta1 model 406) already included in the meta-model topology, systems link the new function (e.g., beta 2 model 408) with the existing function within the meta-model topology. Systems can determine that the new function is similar to the existing function of the plurality of functions included in the meta-model topology based on determining that the new function generates a first label of interest associated with the new function that is similar to a second label of interest associated with the existing particular function.

Systems can link the two functions in different ways. In some instances, one function's input may depend on the other function's output. Additionally, or alternatively, the similar functions are linked together under an abstracted model associated with a particular label of interest or set of similar labels of interest. For example, in some instances, the label of interest associated with the existing function is the binary label of interest (e.g., the function outputs a binary value for the label of interest), and the label of interest associated with the new function is a severity level label of interest (e.g., the function outputs a label value between a predetermined maximum label value and predetermined minimum label value).

Many different labels of interest can be included in the global label schema. For example, labels of interest comprise a hate speech warning label (e.g., endpoint 224), a sexual content warning label (e.g., endpoint 226), a violence warning label, a personal identifying information label (e.g., endpoint 222), or a combination thereof. It should be appreciated that the label of interest may also comprise topic tags that may be of interest to a user or component tags to identify certain components of a data prompt.

Figure 22:
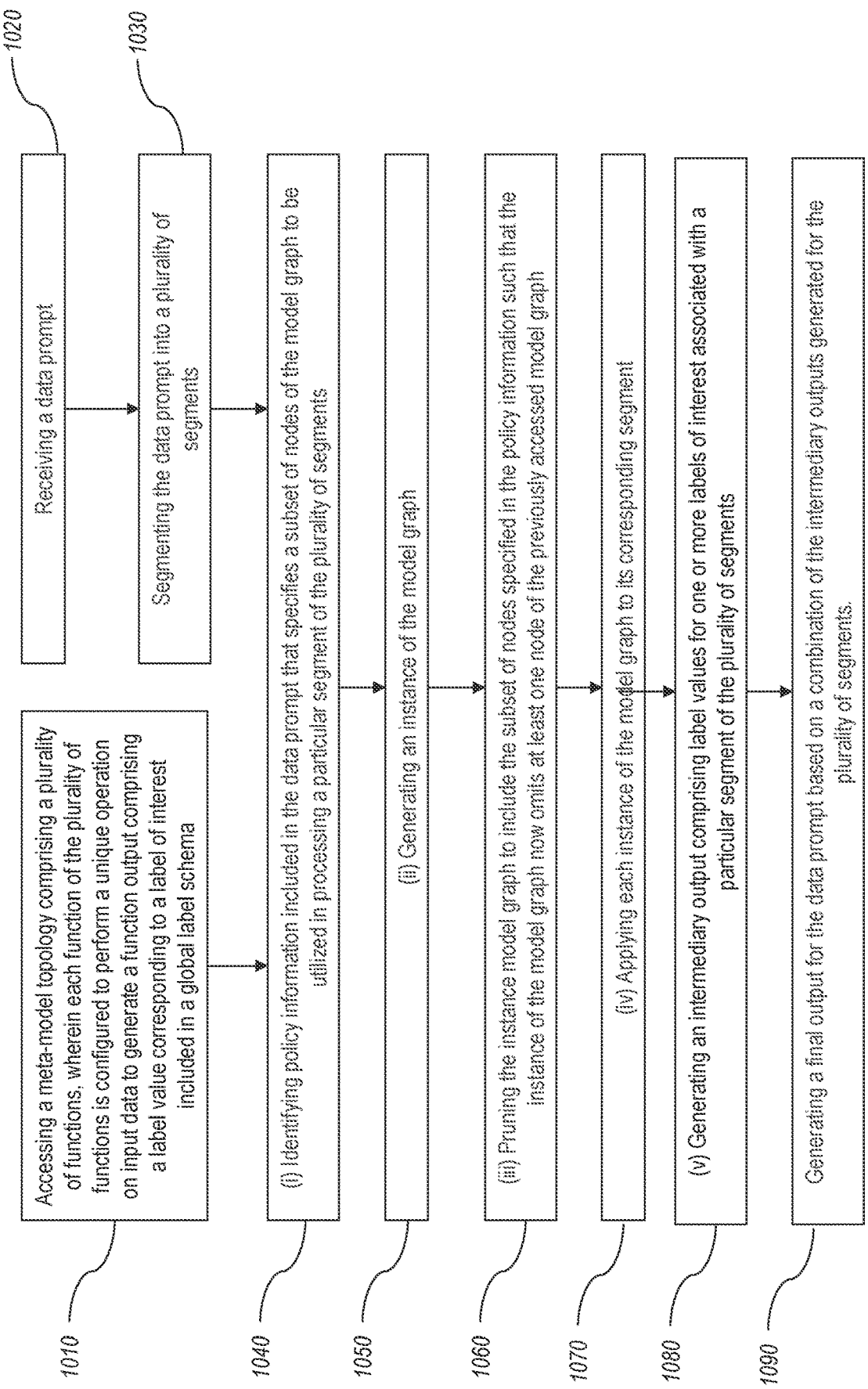
FIG. 22 illustrates an example embodiment of a flow diagram having a plurality of acts associated with methods for processing data using a meta-model topology.

Attention will now be directed to FIG. 22, which illustrates an example embodiment of a flow diagram having a plurality of acts (e.g., act 910, act 920, act 930, act 940, and act 950) associated with a method implemented by a computing system (e.g., computing system 110) for using a model graph (e.g., model graph 116) to perform content moderation on data prompts (e.g., data prompts 117).

The first illustrated act includes an act for accessing a meta-model topology (e.g., meta-model topology 115) comprising a plurality of functions (act 910). Each function of the plurality of functions is configured to operate on input data to generate a function output comprising a label value corresponding to a label of interest included in a global label schema associated with the meta-model topology. A meta-model topology that is configured in this manner beneficially provides a streamlined framework with which to process data prompts. Additionally, because the plurality of functions conforms to the global label schema, output from the meta-model topology (or corresponding model graph) is uniform. Uniform outputs make further downstream analysis or operations more accurate and efficient.

After, concurrently with, or before accessing the meta-model topology, systems receive a data prompt (e.g., data prompts 117) (act 920). In response to receiving the data prompt, the systems generate an instance of the model graph (orchestrator 318) (act 930) and apply the instance of the model graph to the data prompt (act 940). By instantiating separate instances of the model graph, systems can achieve improved processing capacity, including the ability to tune each instance to a particular data prompt. This provides a customized experience for processing data prompts, as well as improving computer memory used by only including nodes in the model graph that are relevant to processing the data prompt and/or desired application.

Based on applying the instance of the model graph to the data prompt, systems generate a label value corresponding to at least one label of interest included in the global label schema for the data prompt (act 950). The label value is based on the output from the model graph. By generating a value for one or more different labels of interest, users and model administrators can monitor the content that is generated by artificial intelligence systems, as well as other content submitted to the system. The value can then be used to determine whether the content should be modified prior to returning the completed prompt to a user-facing system or whether the machine learning model should be tuned or adapted to avoid such content.

In some instances, the method further comprises acts for modifying the data prompt based on the model graph output. For example, some systems determine that the label value for the data prompt is equal to or exceeds a predetermined threshold value. Upon determining that the label value equals or exceeds the predetermined threshold value, the systems identify one or more flagged words in the data prompt that are associated with the label value. Prior to returning the processed data prompt to a client-facing system, the systems modify the data prompt by removing or replacing the one or more flagged words from the data prompt. Subsequent to modifying the data prompt, the systems display the data prompt at a user interface of the client-facing system.

Additionally, or alternatively, some instances of the model graph are configured to moderate content included in the data prompt based on generating label values corresponding to multiple labels of interest included in the global label schema.

In some instances, the method further comprises acts for modifying the model graph based on information associated with the data prompt. For example, some systems identify one or more labels of interest for which to generate label values based on the data prompt. Systems also identify a subset of functions included in the model graph associated with the one or more labels of interest. Prior to applying the model graph to the data prompt, the systems modify the instance of the model graph by omitting one or more functions not included in the identified subset of functions associated with the one or more labels of interest.

Some systems generate multiple instances of the model graph based on segmenting the data prompt. For example, some methods include acts for segmenting the data prompt into a plurality of segments and generating a plurality of instances of the model graph. Each instance of the model graph corresponds to a different segment of the plurality of segments of the data prompt. Systems then apply each instance of the model graph to its corresponding segment. Subsequently, systems generate a plurality of intermediary outputs, wherein each intermediary output comprises one or more label values for one or more labels of interest associated with its corresponding segment of the data prompt. Such outputs are considered intermediate because they correspond to a particular segment of the data prompt, not the entire data prompt. Thus, based on the combination of the intermediary outputs, the systems generate a final output for the data prompt.

It should be appreciated that the systems can segment different types of data prompts, including data prompts that are completed prompts generated by a large language model based on an initial input prompt.

As the number of model graph instances increases, systems are also configured to process the data processing requests associated with different data prompts, and different segments of data prompts, by batching data processing requests for a particular node of the model graph. For example, some methods further comprise acts for identifying a batching criterion for a particular node included in the model graph. Systems also identify and route one or more data processing requests for the particular node to a batching cache or queue corresponding to the particular node.

Systems determine whether the batching criterion has been met. In response to determining that the batching criterion has not been met, the systems refrain from transmitting the one or more processing requests in the batching cache, or alternatively, in response to determining the batching criterion has been met, the system will dispatch and route a batch of the one or more processing requests from the batching cache/queue to the particular node that corresponds to that batching cache for processing.

Figure 23:
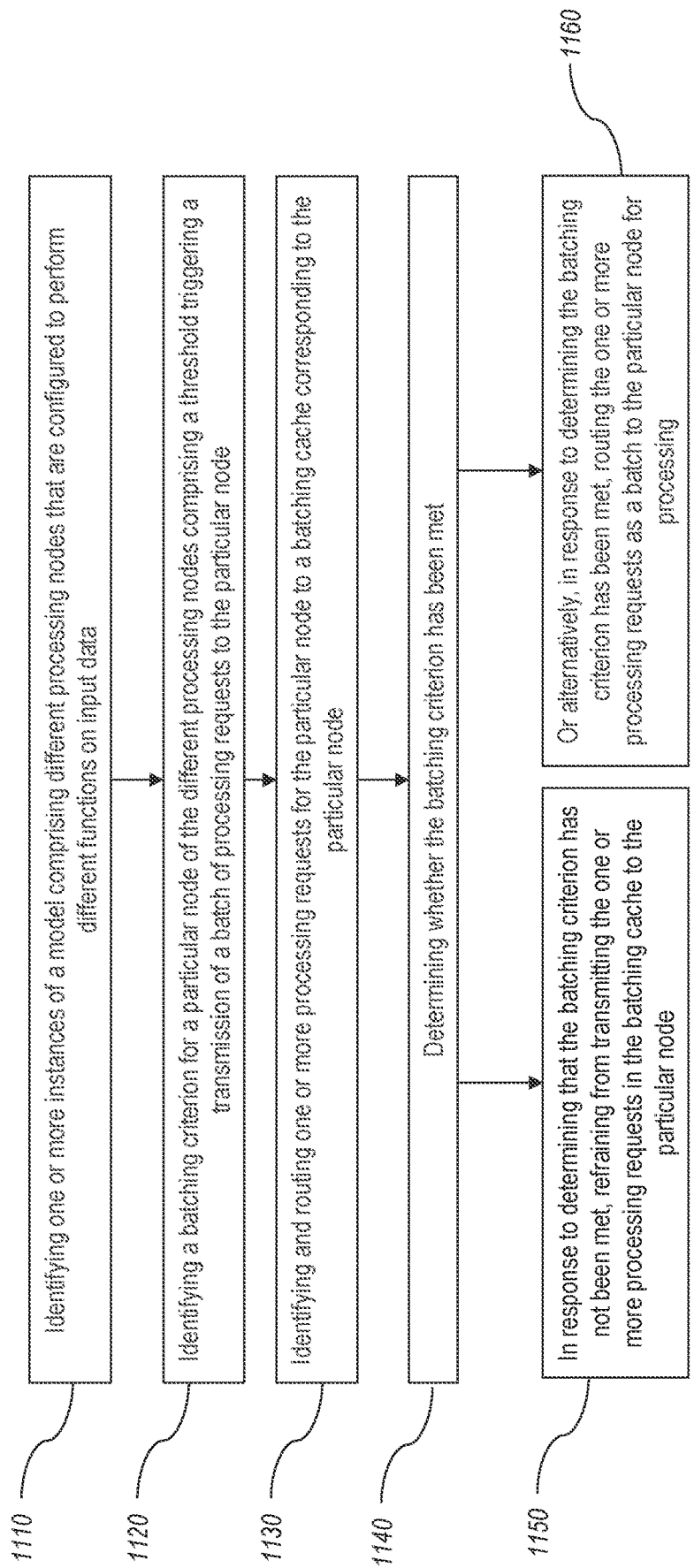
FIG. 23 illustrates an example embodiment of a flow diagram having a plurality of acts associated with methods for segmenting data prompts and processing the segments with multiple instances of a model graph.

Attention will now be directed to FIG. 23, which illustrates an example embodiment of a flow diagram having a plurality of acts (e.g., act 1010, act 1020, act 1030, act 1040, act 1050, act 1060, act 1070, act 1080, and act 1090) associated with a method implemented by a computing system (e.g., computing system 110 for using a model graph (e.g., model graph 116) to perform content moderation on segmented data prompts (e.g., segments 118).

The first illustrated act includes an act for accessing a model graph converted from a meta-model topology (e.g., meta-model topology 115) comprising a plurality of functions (act 1010). The model graph comprises a plurality of nodes representing unique functions configured to perform operations on input data and configured to generate label values corresponding to one or more labels of interest in a global label schema associated with the model graph. The systems also receive a data prompt (e.g., data prompts 117) (act 1020) and segment the data prompt into a plurality of segments (e.g., segments 118) (act 1030). By segmenting the data prompt into a plurality of segments, the system can fine-tune and customize the data prompt processing according to each segment.

For each segment of the data prompt, the systems perform a series of acts (act 1040, act 1050, act 1060, act 1070, and act 1080). For example, for a particular segment of the data prompt, the system identifies policy information (e.g., loaded policy of FIG. 7) included in the data prompt that specifies a subset of nodes of the model graph to be utilized in processing the segment of the data prompt and generates an instance of the model graph (act 1040). An instance of the model graph (e.g., orchestrator 318) is generated for each segment (act 1050).

Thus, based on the policy information, systems then prune the instance of the model graph to include the subset of nodes specified in the policy information such that the instance of the model graph now omits at least one node of the previously accessed model graph (act 1060) (see also FIGS. 14-17). In some instances, the subset of nodes specified by the policy information for a particular segment is identified in the instance of the model graph generated for the particular segments by performing a depth-first search.

After pruning the instance of the model graph, the system applies the instance of the model graph to its corresponding segment (act 1070) and generates an intermediary output comprising label values for one or more labels of interest associated with a particular segment of the plurality of segments of the data prompt (act 1080).

Finally, after all of the intermediary outputs are generated, systems generate a final output for the data prompt based on a combination of the intermediary outputs generated for the plurality of segments (act 1090).

In some instances, pruning the model graph for a particular segment of the plurality of segments further includes: identifying one or more labels of interest from the policy information related to the particular segment, identifying one or more nodes of the model graph that are not related to the one or more labels of interest from the policy information, and omitting the one or more nodes of the model graph in the instance of the model graph that is not related to the one or more labels of interest identified from the policy information.

Some methods associated with FIG. 23 further include acts for: during run-time processing of the data prompt using the model graph, identifying one or more additional nodes included in the pruned instance of the data moderation graph that can be skipped, and skipping the identified one or more additional nodes while processing the particular segment of the plurality of segments with the pruned instance of the data moderation graph.

The data prompts can be generated from different sources. For example, data prompts comprise initial prompts generated by a user (human or otherwise), completed prompts generated by a large language model based on the large language model receiving an initial prompt generated by a user, or even based on electronic content retrieved from a variety of sources.

The policy information is also configured/identified according to different embodiments. For example, in some instances, the policy information is user-defined and appended to the data prompt. Alternatively, the policy information is automatically generated based on analyzing the data prompt to determine which labels of interest apply to the data prompt. In other instances, policy information is selected from a plurality of stored policies, each stored policy of the plurality of stored policies being associated with a particular user or particular enterprise. It should be appreciated that policy information may be derived from a combination of embodiments described above.

Some methods associated with FIG. 23 include further acts for identifying a final output for the entire data prompt based on a combination of each intermediary output from each instance of the model graph generated for the plurality of segments of the data prompt. Based on the final output (i.e., one or more label values for one or more labels of interest for the data prompt), systems modify the plurality of segments of the data prompt by removing portions of one or more segments of the plurality of segments prior to displaying the plurality of prompt segments to a user at a user display.

After the final output is generated from the plurality of instances of the model graph, the data prompt is displayed to a user at a user display based on the hardware configurations and model interfaces utilized by the user system. For example, in some embodiments, the data prompt is displayed as textual output to the user in a format provided by the LLM or another model being applied to the user prompts. In other embodiments, the data prompt is displayed at the user interface with as a modified or annotated prompt that includes and/or is modified based on annotations generated by the orchestrator 318.

By way of example, the systems may determine that a label value for a segment of the data prompt is equal to or exceeds a predetermined threshold value and identify one or more words in the segment of the data prompt that are associated with that offensive label value. Then, prior to displaying the prompt (or prompt segment) to the user, the systems may modify the data prompt by removing or replacing the one or more identified words in the segment of the data prompt that are offensive and display a modified version of the prompt or prompt segment at the user interface/display.

In some instances, the data prompt includes a plurality of separate segments that may be individually processed by the orchestrator instance(s). In these instances, the systems will identify a final output from the plurality of instances of the model graph 320, based on a combination of intermediary outputs generated for each of the plurality of segments of the data prompt. When combined, the final output comprises label values and annotation(s) for one or more labels of interest that are used to annotate the one or more segments of the data prompt. Then, prior to displaying the data prompt to a user at a user display, the systems modify the data prompt by annotating one or segments of the data prompt with the label values for the one or more labels of interest identified by the final output. Then, the modified final output can be displayed as a composite modified data prompt at the user display.

As described, the data prompt, which was analyzed by the meta-model topology, is sometimes modified prior to being transmitted/displayed at a client-facing system. For example, the systems may determine that a label value (i.e., output from an instance of the model graph) for a particular segment of the data prompt is equal to or exceeds a predetermined threshold value. The systems may also identify one or more words in the particular segment of the data prompt that are associated with the label value that exceeds the threshold value. Then, prior to displaying the segment of the data prompt to a client-facing system, the systems may modify the segment of the data prompt by removing or replacing the one or more identified words in the segment of the data prompt and display the modified segment of the data prompt at a user interface of the client-facing system.

It should be appreciated that the meta-model topology beneficially comprises a singular input data entry point (e.g., via a reverse proxy) such that a user is enabled to interface with the singular input data entry point without interfacing with intermediary or underlying functions included in the meta-model topology. By implementing systems in this manner, the user experience is improved and streamlined because the intermediary outputs are abstracted out of sight from the user interface. Even more generally, systems can be implemented such that the systems can be called directly by any client using a bi-directional streaming interface, or as a simple non-streaming request-response interface (e.g., HTTP interface). For example, in a non-LLM scenario, some third-party developers may call the service directly for the purpose of content moderation.

In some instances where multiple instances of the model graph are generated for the different segments, systems identify a batching criterion for a particular node included in different instances of the model graph. Systems also identify one or more processing requests for the particular node across the different instances of the model graph and route the one or more processing requests to a batching cache corresponding to the particular node occurring in one or more of the segment-based model graph instances. Systems then determine whether the batching criterion has been met. In response to determining that the batching criterion has not been met, the system refrains from transmitting the one or more processing requests in the batching cache to the particular node, or alternatively, in response to determining the batching criterion has been met, the systems route the one or more processing requests as a batch to the particular node for processing.

In some instances, where multiple data processing requests for different nodes are received across the different model instances generated for each segment, systems are able to auto-scale the model graph (and/or individual nodes) to improve the processing efficiency of the different data requests. Auto-scaling refers to the process of proactively instantiating instances of the model graph (and/or individual nodes) based on predicting the number of instances needed of the model graph or particular nodes to efficiently execute the received data processing requests. For example, systems predict a number of instances of a particular function/model associated with the particular node that will be needed to process data input based on how many times the particular node is retained across the plurality of instances of the model graph generated for the plurality of segments of the data prompt. Subsequently, the systems auto-scale the model graph according to the predicted number of instances of the particular function to provide the predicted number of instances of the particular function for the particular node. This can occur during or just prior to run-time.

The intermediary outputs for the different instances of the model graph comprise a plurality of different label values. For example, some intermediary outputs of a particular instance of the model graph comprise a binary label value while some intermediary outputs comprise a severity-level label value. Furthermore, the different label values are associated with different labels of interest. For example, one or more labels of interest comprise a hate speech warning label, a sexual content warning label, a violence warning label, or a PPI warning label, among other labels of interest.

The final output for the data prompt is generated based on a combination of the intermediary outputs generated by the different instances of the model graph, such that the final output for the whole data prompt comprises a plurality of label values corresponding to a plurality of labels of interest. Some label values correspond to the same label of interest (i.e., a binary label value and a severity-level label value for the same label).

Figure 24:
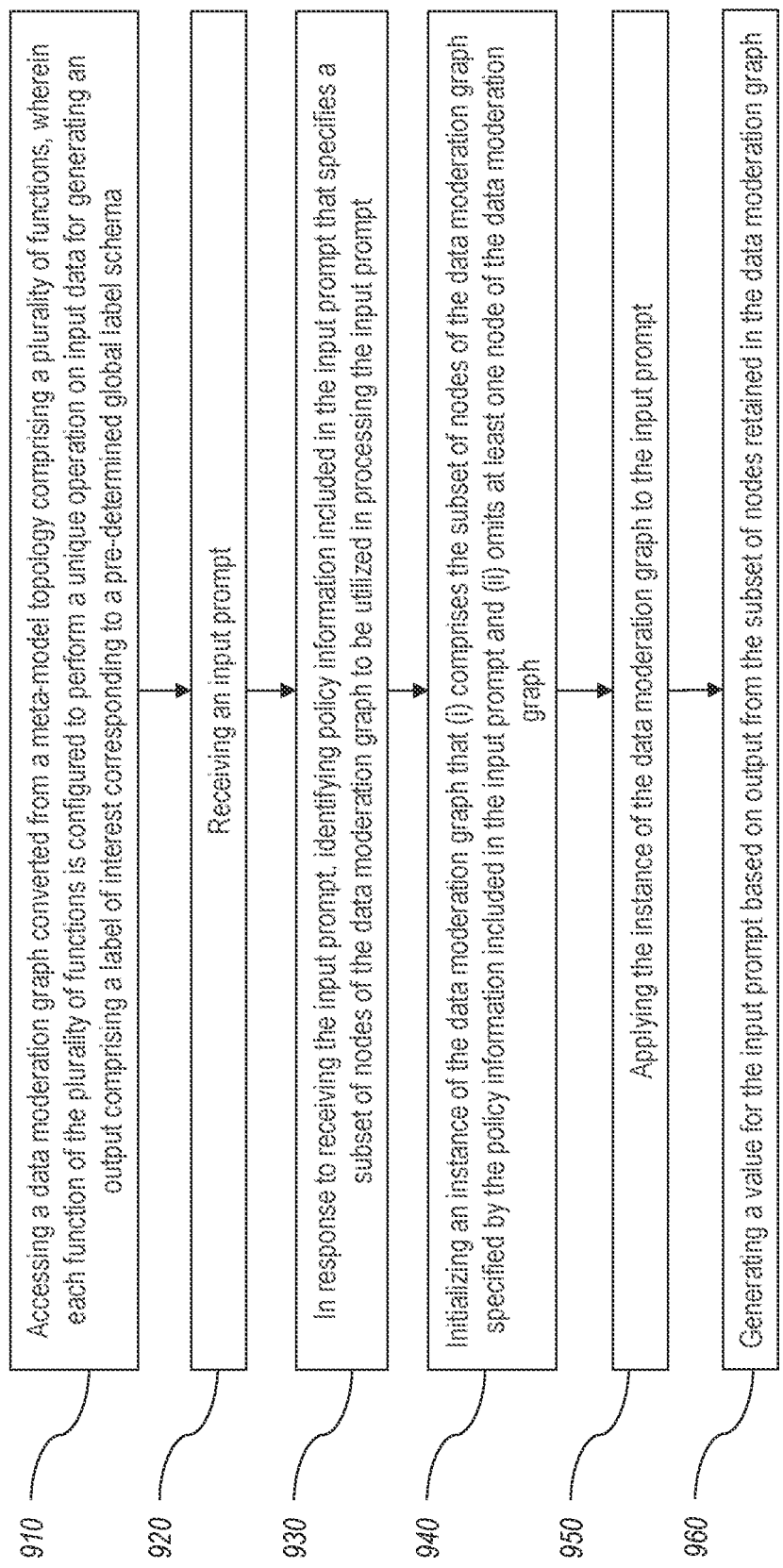
FIG. 24 illustrates an example embodiment of a flow diagram having a plurality of acts associated with methods for dynamic batching of prompt queries.

Attention will now be directed to FIG. 24, which illustrates an example embodiment of a flow diagram having a plurality of acts (e.g., act 1110, act 1120, act 1130, act 1140, act 1150, and act 1160) associated with a method implemented by a computing system (e.g., computing system 110 for using a model graph (e.g., model graph 116) to perform dynamic batching of prompt queries (e.g., data prompts 117).

The first illustrated act includes an act for identifying one or more instances of a model (e.g., instance 702, instance 704, etc.) comprising different processing nodes that are configured to perform different functions on input data (act 1110). It should be appreciated that the model is configurable according to different applications. For example, in one application the model is represented by a model graph that is configured as a data moderation graph, according to embodiments described herein.

Systems also identify at least one batching criterion (e.g., batching criteria 726) for a particular node (e.g., node f5) of the different processing nodes (act 1120). Some examples of batching criteria include waiting to transmit a batch of processing requests until a minimum number of processing requests are received, based on a maximum number of processing requests that a particular node can process, waiting for a predetermined amount of time between receiving batching requests, or another batching criterion. The batching criterion comprises a threshold triggering the transmission of a batch of processing requests to the particular node. During run-time, the system identifies and routes one or more processing requests (e.g., data processing request 714, data processing request 716, etc.) for the particular node to a batching cache (e.g., batch 724) corresponding to the particular node (act 1130). The system then periodically (e.g., after each data processing request is received or predetermined time interval) determines whether the batching criterion has been met (act 1140).

In response to determining that the batching criterion has not been met, the system refrains from transmitting the one or more processing requests in the batching cache (e.g., batch 724) to the particular node (act 1150). Alternatively, in response to determining a batching criterion has been met, the system routes the one or more processing requests (e.g., batch 724) as a batch to the particular node for processing (act 1160). After transmitting the batch of processing requests, the system then processes the batch comprising one or more processing request(s) at the particular node.

By batching together different processing requests, the system can regulate the processing time of each iteration of input data, as well as improve the processing efficiency of the hardware that houses the different instances of the model. These technical benefits are achieved, especially when the computing system comprises GPUs that can efficiently process data processing requests in batches.

In some instances, the batch corresponds to one or more requests received from a plurality of instances of the model. Additionally, or alternatively, each instance of the plurality of instances of the model is generated for a particular segment of a set of input data. In some systems, a batch corresponds to one or more requests received from a plurality of users. Additionally, or alternatively, the batch corresponds to one or more requests received from a plurality of enterprises.

The system is able to identify a number of different types of batching criteria. For example, in some instances, the batching criteria are based on a minimum or maximum number of data processing requests and/or based on a maximum wait time between received data processing requests. In some instances, the maximum wait time is less than a millisecond, or less than a few milliseconds, depending on the model processing specifications.

Some methods associated with FIG. 24 include additional acts for auto-scaling the model/individual layers of the models to improve the processing efficiency of the different batches of data processing requests. In such acts, systems predict a number of instances of a particular function associated with the particular node of the model that will be needed to process data input based on how many times the particular node is retained across the plurality of instances of the model. Then, systems auto-scale the model according to the predicted number of instances of the particular function to provide the predicted number of instances of the particular function for the particular node at run-time.

In some systems, auto-scaling is performed by instantiating a plurality of instances of the model for different segments of a data input. Additionally, or alternatively, the plurality of instances of the model is instantiated for multiple data inputs across different users of an enterprise. In some systems, the plurality of instances of the model is instantiated for multiple data inputs across different enterprises.

When the instances of the model are instantiated for different segments of data input, methods include acts for segmenting an input data prompt into a plurality of segments.

Then for each segment of the plurality of segments, systems are configured for (i) identifying policy information included in the input prompt that specifies a subset of nodes of the data moderation graph to be utilized in processing a particular segment of the plurality of segments; (ii) generating an instance of the model; (iii) pruning the instance model to include the subset of nodes specified in the policy information such that the instance of the model now omits at least one node of the accessed data moderation graph; and (iv) generating an intermediary output comprising one or more labels of interest associated with a particular segment of the plurality of segments. Finally, systems generate a final output based on a combination of each intermediary output generated for the plurality of segments.

The data prompt (i.e., input data to the meta-model topology) which is segmented comprises different formats. For example, some input data comprises different electronic content, including data prompts. Some data prompts comprise an initial prompt generated by a user, while some data prompts comprise a completed prompt generated by a large language model based on the large language model receiving an initial prompt generated by a user.

In a similar fashion to auto-scaling the different nodes which call to local or remote models, systems can also auto-scale the number of instances of a model by predicting the number of instances of the model that will be needed to process the batches of data processing requests based on an amount of input data and autoscaling the model according to the predicted number of instances of the model to provide the predicted number of instances of the model at run-time.

In view of the foregoing, it should be appreciated that the disclosed embodiments provide many technical benefits over conventional systems, methods, and frameworks. For example, the systems and methods described herein beneficially facilitate the distribution of service components necessary to orchestrate the evaluation of an ever-growing number of models. This evaluation also extends to labels and policies for content moderation schemes. Such frameworks also create definitions of the interfaces, contracts, and libraries to enable cross-organization teams to be able to contribute their models into production using a programmatic and uniform specification.

Disclosed embodiments also improve the user experience by abstracting away the multitude of models, labels, and taxonomies created for different modalities, such as speech, text, and image. Such embodiments allow for easy, "no code" composition of these models into a coherent set of content moderation configuration objects and policies. Thus, for any change in the models, the underlying network is abstracted away from the user, wherein the user is presented with a streamlined user interface for a singular, monolithically content moderation meta-model. With such embodiments, users can gain access to higher-quality systems without needing to understand the details behind each model included in the system.

In some embodiments, the system comprises a single model, such as an LLM model or generative pre-trained (GPT) model. Alternatively, the system comprises a plurality of models assembled. In either case, the model(s) included in the system are conformed to a global label schema that comprises a set of pre-defined labels and taxonomies. Beneficially, any backend changes to the model(s) of the system will not affect the streamlined nature in which a user interacts with the front-end interface.

Overall, the disclosed embodiments facilitate close collaborations between many different model owners, provide standardization across models for labels and taxonomy, flexibility in the composition of models used in a particular user's deployment of the meta-model, and facilitate low-latency execution.

Example Computing Systems

It will be appreciated that the disclosed embodiments may include, be practiced by, or implemented by a computer system that is configured with computer storage that stores computer-executable instructions that, when executed by one or more processing systems (e.g., one or more hardware processors) of the computer system, cause various functions to be performed, such as the acts recited above.

Embodiments within the scope of the present disclosure also include physical and other computer-readable media for carrying or storing computer-executable instructions and/or data structures. Such computer-readable media can be any available media that can be accessed by a general-purpose or special-purpose computer system. Computer-readable media that store computer-executable instructions are physical storage media. Computer-readable media that carry computer-executable instructions are transmission media. Thus, by way of example, embodiments of the disclosure can comprise at least two distinctly different kinds of computer-readable media: physical computer-readable storage media and transmission computer-readable media.

Physical computer-readable storage media includes random access memory (RAM), read-only memory (ROM), electrically erasable programmable ROM (EEPROM), compact disk ROM (CD-ROM), or other optical disk storage (such as compact disks (CDs), digital video disks (DVDs), etc.), magnetic disk storage or other magnetic storage devices, or any other hardware storage devices which can be used to store desired program code in the form of computer-executable instructions or data structures and which can be accessed by a general purpose or special purpose computer.

When information is transferred or provided over a network or another communications connection (either hardwired, wireless, or a combination of hardwired or wireless) to a computer, the computer properly views the connection as a transmission medium. Transmission media can include a network and/or data links that can be used to carry desired program code means in the form of computer-executable instructions or data structures and which can be accessed by a general-purpose or special-purpose computer. Combinations of the above are also included within the scope of computer-readable media.

Further, upon reaching various computer system components, program code in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a network interface card (NIC)), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

As a note, unless otherwise specified, the terms "set" and "subset" are intended to exclude an empty set, and thus "set" is defined as a non-empty set, "superset" is defined as a non-empty superset, and "subset" is defined as a non-empty subset. Unless otherwise specified, the term "subset" excludes the entirety of its superset (i.e., the superset contains at least one item not included in the subset). Unless otherwise specified, a "superset" can include at least one additional element and a "subset" can exclude at least one element.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A method for deploying a model graph, the method comprising:
   accessing a meta-model topology comprising a plurality of functions, wherein each function of the plurality of functions is configured to perform an operation on input data to generate an output comprising a label of interest corresponding to a label included in a global label schema;
   accessing a new function not included in the plurality of functions to be integrated into the meta-model topology;
   identifying a particular label of interest from the global label schema that is associated with the new function;
   configuring the new function such that an output from the new function conforms to an output form corresponding to the particular label of interest from the global label schema;
   subsequent to configuring the new function, integrating the new function into the meta-model topology;
   converting the meta-model topology into a model graph comprising a plurality of nodes and a plurality of edges, wherein each function of the plurality of functions is represented as a node within the model graph and wherein each edge of the plurality of edges that connects at least two nodes in the model graph represents a data dependency between different functions of the plurality of functions; and
   deploying the model graph to a remote application that is configured to receive data prompts comprising input data.

2. The method of claim 1, further comprising:
   receiving a data processing request at the remote application;
   in response to receiving the data processing request, generating an instance of the model graph; and
   applying the model graph to a data prompt corresponding with the data processing request.

3. The method of claim 2, wherein the data prompt is an initial prompt generated by a user.

4. The method of claim 2, wherein the data prompt is a completed prompt generated by a large language model based on the large language model receiving an initial prompt generated by a user.

5. The method of claim 1, further comprising:
   (i) determining which labels of interest from the global label schema are associated with different functions of the plurality of functions included in the meta-model topology; and
   (ii) generating one or more subsets of linked functions, each subset comprising one or more functions that are conformed to generate an output form corresponding to a similar or equal label of interest.

6. The method of claim 1, wherein the meta-model topology comprises a singular input data entry point and singular output data exit point, such that a user is enabled to interface with the singular input data entry point and singular output data exit point without interfacing with intermediary outputs generated by individual functions included in the meta-model topology.

7. The method of claim 1, further comprising:
   accessing a new function not included in the plurality of functions to be integrated into the meta-model topology;
   identifying a new label of interest that is associated with the new function;
   integrating the new function into the meta-model topology; and
   updating the global label schema with the new label of interest associated with the new function.

8. The method of claim 7, further comprising:
   determining that the new function is similar to a particular function of the plurality of functions; and
   linking the new function with the particular function that is similar to the new function within the meta-model topology.

9. The method of claim 8, wherein the new function is determined to be similar to the particular function of the plurality of functions based on determining that the new function generates a first label of interest associated with the new function that is similar to a second label of interest associated with the particular function.

10. The method of claim 9, wherein the second label of interest associated with the particular function is a binary label of interest and the first label of Interest associated with the new function is a severity level label of interest.

11. The method of claim 1, wherein the particular label of interest comprises a hate speech warning label.

12. The method of claim 1, wherein the particular label of interest comprises a sexual content warning label.

13. The method of claim 1, wherein the particular label of interest comprises a violence warning label.

14. A computer system that deploys a model graph, the computer system comprising:
   one or more processors; and one or more hardware storage devices that store instructions that are executable by the one or more processors to cause the computer system to:

access a meta-model topology comprising a plurality of functions, wherein each function of the plurality of functions is configured to perform an operation on input data to generate an output comprising a label of interest corresponding to a label included in a global label schema;

access a new function not included in the plurality of functions to be integrated into the meta-model topology;

identify a particular label of interest from the global label schema that is associated with the new function;

configure the new function such that an output from the new function conforms to an output form corresponding to the particular label of interest from the global label schema;

subsequent to configuring the new function, integrate the new function into the meta-model topology;

convert the meta-model topology into a model graph comprising a plurality of nodes and a plurality of edges, wherein each function of the plurality of functions is represented as a node within the model graph and wherein each edge of the plurality of edges that connects at least two nodes in the model graph represents a data dependency between different functions of the plurality of functions; and deploy the model graph to a remote application that is configured to receive data prompts comprising input data.

15. The computer system of claim 14, wherein the particular label of interest comprises a hate speech warning label.

16. The computer system of claim 14, wherein the particular label of interest comprises a sexual content warning label.

17. The computer system of claim 14, wherein the particular label of interest comprises a violence warning label.

18. One or more hardware storage devices that store instructions that are executable by one or more processors to cause the one or more processors to:

access a meta-model topology comprising a plurality of functions, wherein each function of the plurality of functions is configured to perform an operation on input data to generate an output comprising a label of interest corresponding to a label included in a global label schema;

access a new function not included in the plurality of functions to be integrated into the meta-model topology;

identify a particular label of interest from the global label schema that is associated with the new function;

configure the new function such that an output from the new function conforms to an output form corresponding to the particular label of interest from the global label schema;

subsequent to configuring the new function, integrate the new function into the meta-model topology;

convert the meta-model topology into a model graph comprising a plurality of nodes and a plurality of edges, wherein each function of the plurality of functions is represented as a node within the model graph and wherein each edge of the plurality of edges that connects at least two nodes in the model graph represents a data dependency between different functions of the plurality of functions; and deploy the model graph to a remote application that is configured to receive data prompts comprising input data.

19. The one or more hardware storage devices of claim 18, wherein the particular label of interest comprises a sexual content warning label.

20. The one or more hardware storage devices of claim 18, wherein the particular label of interest comprises a violence warning label.

\* \* \* \* \*